United States Patent
Hirata

(10) Patent No.: US 10,666,889 B2
(45) Date of Patent: May 26, 2020

(54) SOLID-STATE IMAGING ELEMENT, SOLID-STATE IMAGING ELEMENT OPERATION METHOD, IMAGING APPARATUS, AND ELECTRONIC DEVICE FOR SUPPRESSING IMAGE BREAKUP OF MOVING SUBJECTS

(71) Applicant: SONY CORPORATION, Tokyo (JP)

(72) Inventor: Eiji Hirata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/085,132

(22) PCT Filed: Mar. 9, 2017

(86) PCT No.: PCT/JP2017/009365
§ 371 (c)(1),
(2) Date: Sep. 14, 2018

(87) PCT Pub. No.: WO2017/163889
PCT Pub. Date: Sep. 28, 2017

(65) Prior Publication Data
US 2019/0089919 A1    Mar. 21, 2019

(30) Foreign Application Priority Data
Mar. 23, 2016 (JP) .................... 2016-058433

(51) Int. Cl.
*H04N 5/335* (2011.01)
*H04N 5/3745* (2011.01)
(Continued)

(52) U.S. Cl.
CPC ......... *H04N 5/37455* (2013.01); *H04N 5/341* (2013.01); *H04N 5/378* (2013.01);
(Continued)

(58) Field of Classification Search
CPC .. H04N 5/37455; H04N 5/341; H04N 5/3765; H04N 5/378; H04N 9/045
(Continued)

(56) References Cited

U.S. PATENT DOCUMENTS

| 2008/0180555 A1 | 7/2008 | Sato et al. |
| 2014/0320719 A1 | 10/2014 | Tsuji et al. |
| 2015/0237287 A1* | 8/2015 | Tatsuzawa ............. H04N 5/341 348/302 |

FOREIGN PATENT DOCUMENTS

| CN | 103975579 A | 8/2014 |
| CN | 104869331 A | 8/2015 |

(Continued)

OTHER PUBLICATIONS

International Search Report and Written Opinion of PCT Application No. PCT/JP2017/009365, dated Jun. 6, 2017, 09 pages of ISRWO.

*Primary Examiner* — Usman A Khan
(74) *Attorney, Agent, or Firm* — Chip Law Group

(57) ABSTRACT

The present disclosure relates to a solid-state imaging element capable of suppressing an occurrence of image breakup in imaging of a moving subject, a solid-state imaging element operation method, an imaging apparatus, and an electronic device. Pixel signals of G pixels (including Gb and Gr pixels) defined as a reference of a luminance value among pixels of images captured by an imaging element are simultaneously scanned to undergo analog-to-digital conversion in an order not causing stagnation in a predetermined direction of analog-to-digital conversion, and at this time, R and B pixels other than the pixels defined as the reference of the luminance value undergo analog-to-digital conversion by simultaneous scan of pixels in the vicinity of the G pixels defined as the reference of the luminance value that undergo analog-to-digital conversion.

(Continued)

The present disclosure can be applied to an imaging apparatus.

9 Claims, 13 Drawing Sheets

(51) Int. Cl.
*H04N 5/378* (2011.01)
*H04N 9/04* (2006.01)
*H04N 5/341* (2011.01)
*H04N 5/376* (2011.01)

(52) U.S. Cl.
CPC ........... *H04N 5/3765* (2013.01); *H04N 9/045* (2013.01); *H04N 9/04557* (2018.08)

(58) Field of Classification Search
USPC ....................................................... 348/294
See application file for complete search history.

(56) References Cited

FOREIGN PATENT DOCUMENTS

| | | |
|---|---|---|
| JP | 2008-172607 A | 7/2008 |
| JP | 2013-121027 A | 6/2013 |
| JP | 2015-156556 A | 8/2015 |
| JP | 2016-012905 A | 1/2016 |
| KR | 10-2014-0107212 A | 9/2014 |
| KR | 10-2015-0098547 A | 8/2015 |
| WO | 2013/084808 A1 | 6/2013 |

* cited by examiner

SOLID-STATE IMAGING ELEMENT, SOLID-STATE IMAGING ELEMENT OPERATION METHOD, IMAGING APPARATUS, AND ELECTRONIC DEVICE FOR SUPPRESSING IMAGE BREAKUP OF MOVING SUBJECTS

CROSS REFERENCE TO RELATED APPLICATIONS

This application is a U.S. National Phase of International Patent Application No. PCT/JP2017/009365 filed on Mar. 9, 2017, which claims priority benefit of Japanese Patent Application No. JP 2016-058433 filed in the Japan Patent Office on Mar. 23, 2016. Each of the above-referenced applications is hereby incorporated herein by reference in its entirety.

TECHNICAL FIELD

The present disclosure relates to a solid-state imaging element, a solid-state imaging element operation method, an imaging apparatus, and an electronic device, and particularly related to a solid-state imaging element capable of suppressing an occurrence of image breakup, a solid-state imaging element operation method, an imaging apparatus, and an electronic device.

BACKGROUND ART

Conventionally, there is a high demand for a solid-state imaging element capable of reading out pixel signals at high speed. Furthermore, due to the recent expansion of applications used in small terminals such as smartphones and wearable devices, there is also a high demand for suppressing power consumption of solid-state imaging elements. For example, while a conventional method of achieving high speed is by increasing the number of parallel stages of the column parallel analog-digital (AD) converter as described above, this method increases power consumption in proportion to the increase in the number of parallel stages of the column parallel AD converter, making it difficult to improve the power efficiency (=speed/power). In other words, the power consumption increases with the speeding up, while the speed is reduced with the reduction of the power consumption.

As a countermeasure, there is a proposed technique (refer to Patent Document 1) that performs AD conversion operation of a pixel signal output from a pixel connected via another vertical signal line in parallel with reset operation or signal transfer operation of a pixel connected via a part of vertical signal lines so as to reduce power consumption by alternately repeating the above operations.

CITATION LIST

Patent Document

Patent Document 1: Japanese Patent Application Laid-Open No. 2016-012905

SUMMARY OF THE INVENTION

Problems to be Solved by the Invention

Meanwhile, in a row scan type or column scan type solid-state imaging element, an increase in the number of simultaneous scanning rows or simultaneous scanning columns causes the pixel positions accessed for AD conversion to be accessed sequentially to the pixels in the vicinity, and this processing is repeated in many cases. In this case, the pixel access is stagnated within a microscopic range, leading to an occurrence of a state referred to as image breakup, in which an image of a moving subject appears to be broken up due to stagnation of the pixel access.

The present disclosure has been made in view of such a situation, and aims to suppress in particular this image breakup of moving subjects.

Solutions to Problems

A solid-state imaging element according to one aspect of the present disclosure includes: an imaging element that has a predetermined color arrangement on a pixel basis and captures an image; and an analog-to-digital converter that simultaneously scans pixel signals of the image in a predetermined direction to perform analog-to-digital conversion of the signals, in which the analog-to-digital converter performs analog-to-digital conversion on pixel signals of pixels having a color arrangement defined as a reference of a luminance value among the pixels of the image in an order not causing stagnation in the predetermined direction.

It is possible to allow the analog-to-digital converter to perform analog-to-digital conversion on pixel signals of pixels having a color arrangement defined as a reference of a luminance value among the pixel signals of the image in an order not causing stagnation in the predetermined direction, in accordance with pixel array, the number of rows or the number of columns for simultaneous scanning and the number of pixels that share floating diffusion (FD).

The pixel array may include a Bayer array, a stripe array, a delta array, a mosaic array, and a white-red-green-blue (WRGB) pixel array.

The pixel array may include pixels having different exposure times as pixels with different color arrangements.

The pixels of the color arrangement as the reference of the luminance value may include green pixels and white pixels.

It is possible to allow the analog-to-digital converter to perform simultaneous scan and analog-to-digital conversion on the pixel signals of the pixels having the color arrangement other than the color arrangement defined as the reference of the luminance value and the pixels in the vicinity of the pixel having the color arrangement defined as the reference of the luminance value, or perform analog-to-digital conversion at the timing in the vicinity thereof.

A solid-state imaging element operation method according to one aspect of the present technology is an operation method for a solid-state imaging element including: an imaging element that has a predetermined color arrangement on a pixel basis and captures an image; and an analog-to-digital converter that simultaneously scans pixel signals of the image in a predetermined direction to perform analog-to-digital conversion of the signals, in which the analog-to-digital converter performs analog-to-digital conversion on pixel signals of pixels having a color arrangement defined as a reference of a luminance value among the pixels of the image in an order not causing stagnation in the predetermined direction.

An imaging apparatus according to one aspect of the present technology includes: an imaging element that has a predetermined color arrangement on a pixel basis and captures an image; and an analog-to-digital converter that simultaneously scans pixel signals of the image in a predetermined direction to perform analog-to-digital conversion of the signals, in which the analog-to-digital converter performs analog-to-digital conversion on pixel signals of pixels having a color arrangement defined as a reference of a luminance value among the pixels of the image in an order not causing stagnation in the predetermined direction.

An electronic device according to one aspect of the present technology includes: an imaging element that has a predetermined color arrangement on a pixel basis and captures an image; and an analog-to-digital converter that simultaneously scans pixel signals of the image in a predetermined direction to perform analog-to-digital conversion of the signals, in which the analog-to-digital converter performs analog-to-digital conversion on pixel signals of pixels having a color arrangement defined as a reference of a luminance value among the pixels of the image in an order not causing stagnation in the predetermined direction.

In one aspect of the present technology, an image having a predetermined color arrangement on a pixel basis is captured, pixel signals of the image are simultaneously scanned in a predetermined direction to undergo analog-to-digital conversion, and analog-to-digital conversion is performed on the pixel signals of pixels having a color arrangement defined as a reference of a luminance value among the pixels of the image in an order not causing stagnation in the predetermined direction.

Effects of the Invention

According to one aspect of the present disclosure, it is possible to suppress image breakup when imaging a moving subject.

MODE FOR CARRYING OUT THE INVENTION

Figure 1:
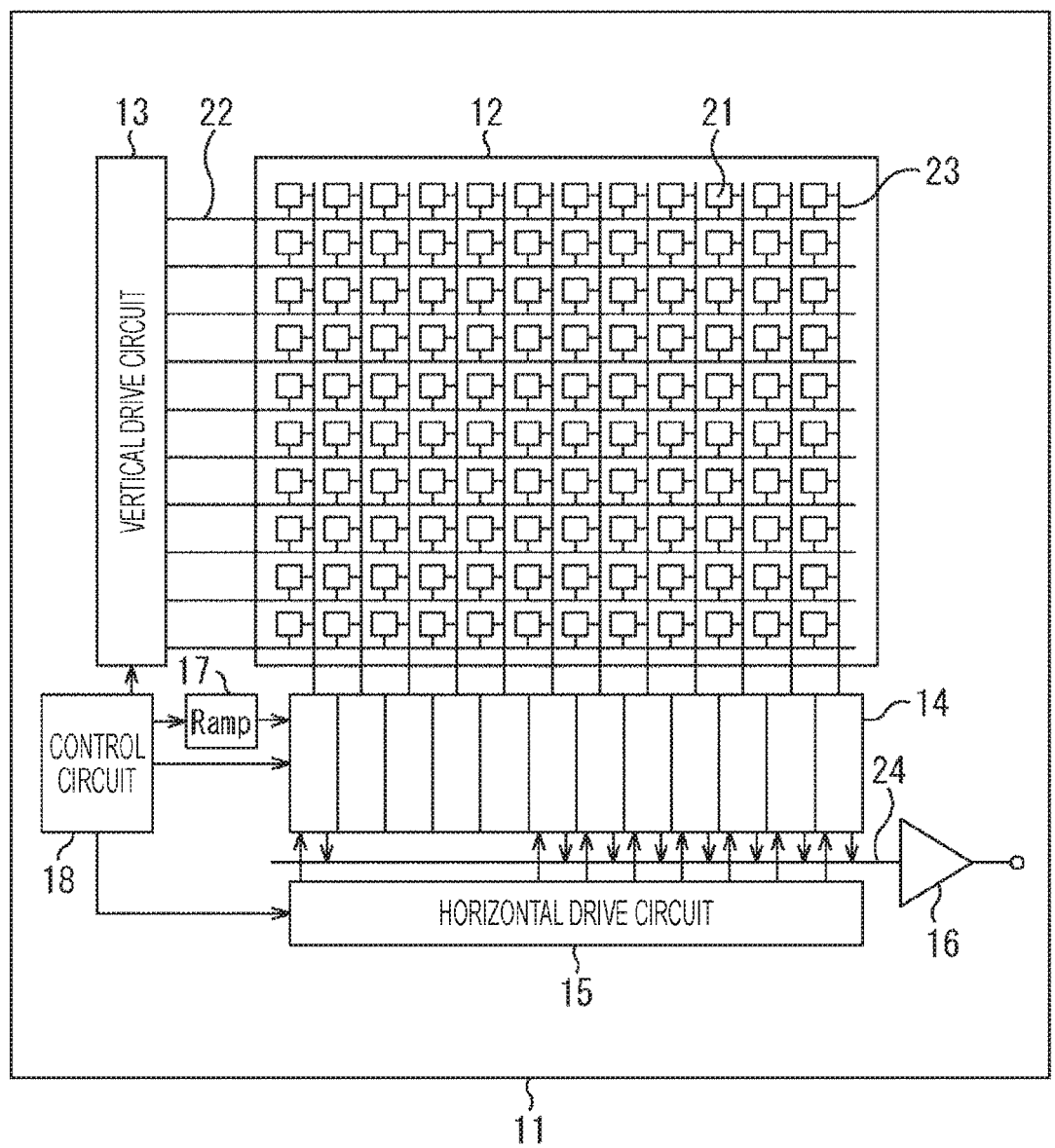
FIG. 1 is a diagram illustrating a schematic structure of a solid-state imaging apparatus according to the present technology.

Hereinafter, preferred embodiments of the present disclosure will be described in detail with reference to the accompanying drawings. Note that, same reference numerals are given to constituent elements having substantially the same functional configuration, and redundant explanation is omitted in the present specification and the drawings.

FIG. 1 is a block diagram illustrating a configuration example of an imaging element (solid-state imaging element) according to an embodiment of the present technology.

As illustrated in FIG. 1, an imaging element 11 includes a pixel region 12, a vertical drive circuit 13, a column signal processing circuit 14, a horizontal drive circuit 15, an output circuit 16, a ramp signal generation circuit 17, and a control circuit 18.

The pixel region 12 is a light receiving surface that receives light collected by an optical system (not illustrated). The pixel region 12 includes a plurality of pixels 21 arranged in a matrix. Each of the pixels 21 is connected to the vertical drive circuit 13 row by row via a horizontal signal line 22, while being connected to the column signal processing circuit 14 column by column via the vertical signal line 23. Each of the plurality of pixels 21 outputs a pixel signal having a level corresponding to the light amount of light to be received individually, and an image of a subject to be formed in the pixel region 12 is constructed from the pixel signals.

The vertical drive circuit 13 sequentially supplies drive signals to drive (transfer, select, reset, or the like) each of the pixels 21, row by row of the plurality of pixels 21 arranged in the pixel region 12, to the pixel 21 via the horizontal signal line 22.

The column signal processing circuit 14 performs correlated double sampling (CDS) processing on the pixel signal output from the plurality of pixels 21 via the vertical signal line 23 so as to perform AD conversion of the pixel signal and remove reset noise. For example, the column signal processing circuit 14 includes a plurality of column AD circuits 14a corresponding to the number of columns of the pixels 21, enabling execution of CDS processing in parallel for each of the columns of the pixels 21.

The horizontal drive circuit 15 sequentially supplies a drive signal for causing the column signal processing circuit 14 to output the pixel signal from the column signal processing circuit 14 to the data output signal line 24 for each of the columns of the plurality of pixels 21 arranged in the pixel region 12.

The output circuit 16 amplifies the pixel signal supplied from the column signal processing circuit 14 via the data output signal line 24 at a timing corresponding to the drive signal of the horizontal drive circuit 15, and outputs the amplified pixel signal to a signal processing circuit of the subsequent stage.

The ramp signal generation circuit 17 generates a ramp signal of a voltage (slope voltage) that drops with the lapse of time in a constant gradient as a reference signal to be referred to when the column signal processing circuit 14 performs AD conversion of the pixel signal, and supplies the generated signal to the column signal processing circuit 14.

The control circuit 18 controls driving of each of blocks inside the imaging element 11. For example, the control circuit 18 generates a clock signal corresponding to the driving cycle of each of the blocks and supplies the clock signal to each of the blocks. Furthermore, the control circuit 18 performs control such that the pixel signal is read out from the pixel 21 to enable the column signal processing circuit 14 to perform AD conversion of the pixel signal at a high speed, for example.

<Configuration Example of Column Signal Processing Circuit>

The column signal processing circuit 14 includes the plurality of column AD circuits 14a corresponding to the number of columns of the pixels 21.

Figure 2:
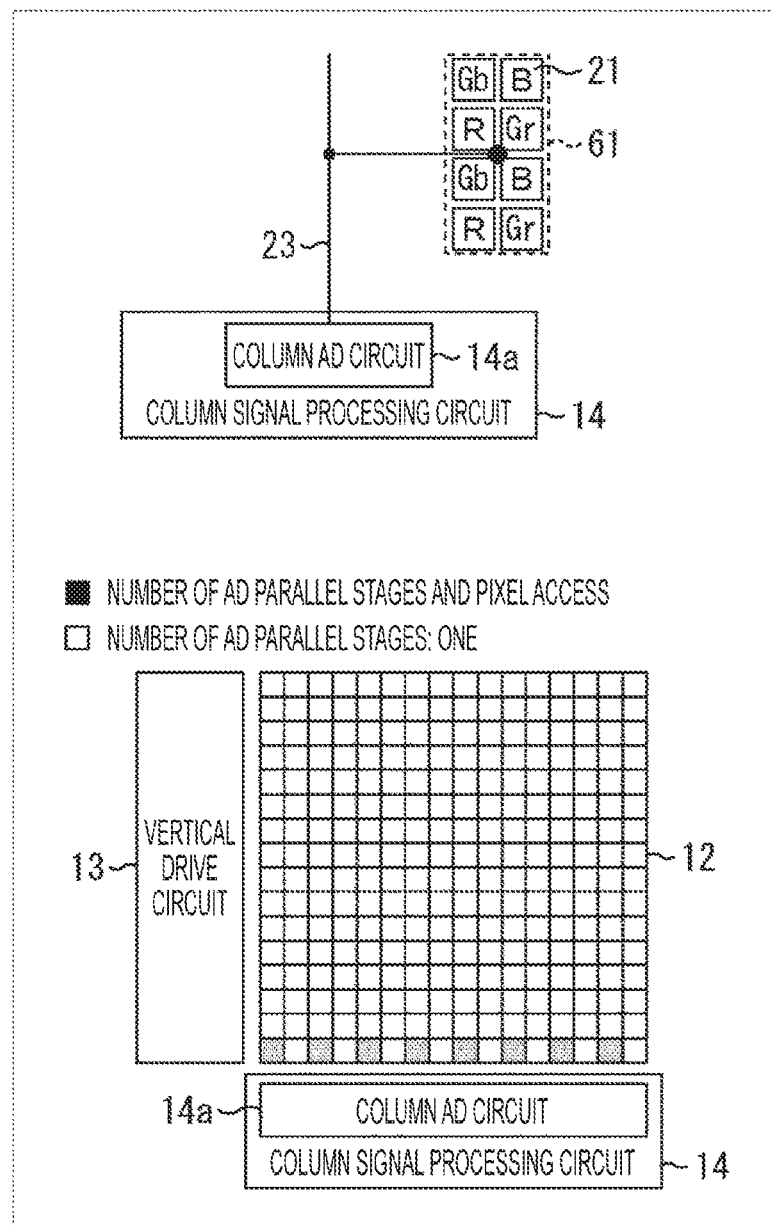
FIG. 2 is a diagram illustrating a relationship between a column signal processing circuit and sharing pixels in a case where the number of parallel stages is one.

Note that as illustrated in the upper part of FIG. 2, it is assumed that the pixels are arranged in the Bayer array, having a sharing pixel structure in which floating diffusion (FD) is shared in one column AD circuit 14a by a total of eight pixels of 4 pixels×2 pixels (=the number of rows×the number of columns). Hereinafter, the unit of eight pixels will be referred to as a sharing pixel 61.

In this case, as illustrated in the lower part of FIG. 2, the column AD circuit 14a has the number of parallel stages of one, enabling AD conversion with access to the pixels of every other column for one pixel row by one pixel access.

Accordingly, after AD conversion of a pixel signal of an access position in the lower stage of FIG. 2, for example, the column AD circuit 14a accesses the pixel in the right adjacent column in the figure and performs AD conversion on the pixel, then, moves one row upward in the figure and accesses the pixel in the left adjacent column, performs AD conversion on the pixel, and further accesses the pixel in the right adjacent pixel and performs AD conversion. This processing is repeated.

Figure 3:
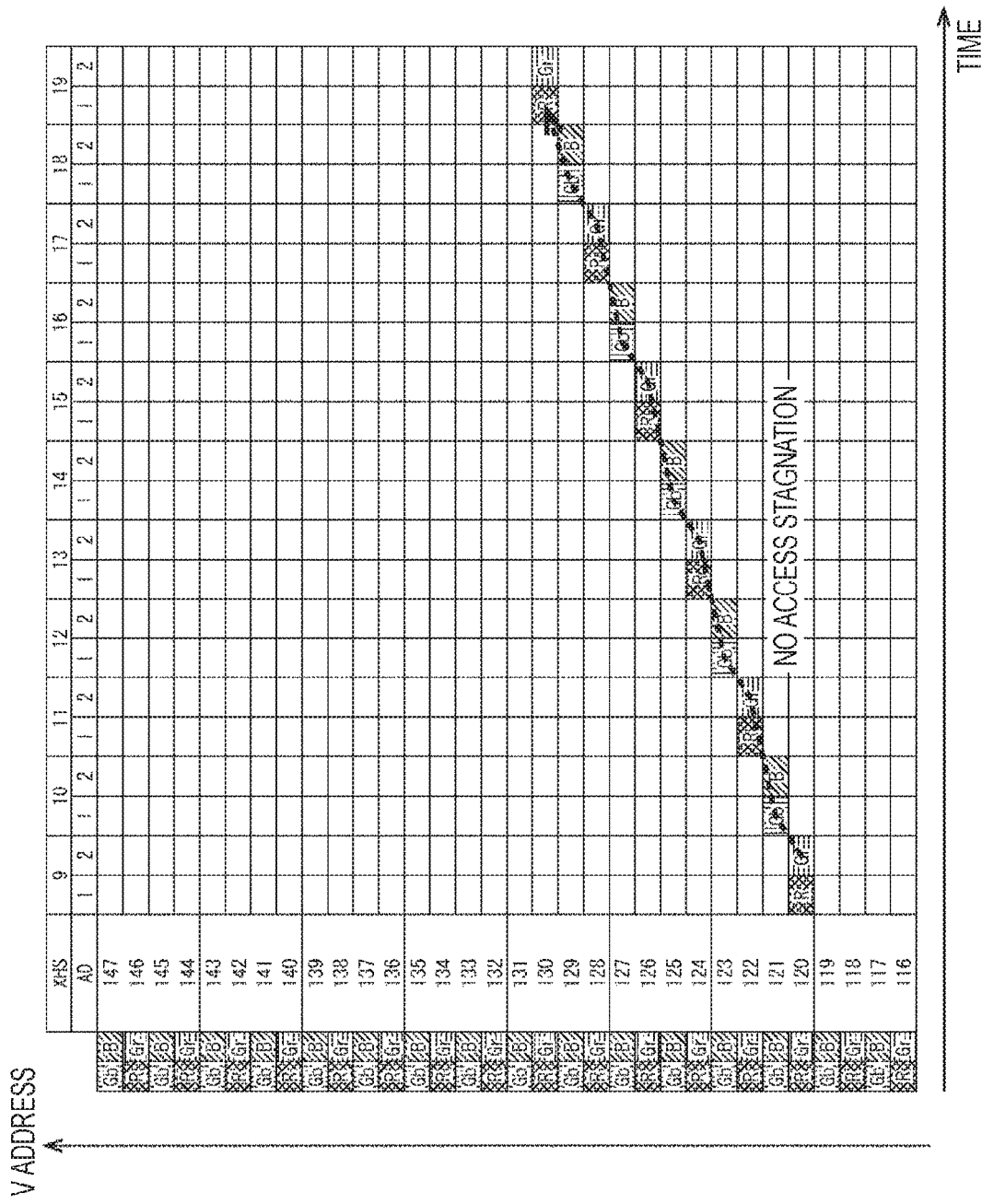
FIG. 3 is a diagram illustrating a conventional pixel access in AD conversion in the column signal processing circuit in FIG. 2.

Conventionally, the AD conversion of one pixel accessed by the column AD circuit 14a is sequentially performed in time series as illustrated in FIG. 3.

Here, FIG. 3 illustrates a change in the vertical direction in time series of the pixel position accessed by the column signal processing circuit 14 in a case where the column signal processing circuit 14 includes one stage of one row of the column AD circuit 14a. More specifically, FIG. 3 illustrates in time series displacement of the sharing pixel 61 in the 120th row in the vertical direction from the lower left R pixel in the vertical direction and the pixels being accessed.

More specifically, at a first timing indicated by XHS=9 and AD=1 in the figure, the column AD circuit 14a performs AD conversion on a pixel signal of an R pixel on the left side of the lowest stage of the sharing pixel 61 in the 120th row.

At a second timing indicated by XHS=9 and AD=2 in the figure, the column AD circuit 14a performs AD conversion on a pixel signal of a Gr pixel on the right side of the lowest stage of the sharing pixel 61 in the 120th row.

At a third timing indicated by XHS=10 and AD=1 in the figure, the column AD circuit 14a moves one row in the vertical direction and performs AD conversion on a pixel signal of a Gb pixel on the left side of the second lowest stage of the sharing pixel 61 in the 121st row.

At a fourth timing indicated by XHS=10 and AD=2 in the figure, the column AD circuit 14a performs AD conversion on a pixel signal of a B pixel on the right side of the second lowest stage of the sharing pixel 61 in the 121st row.

At a fifth timing indicated by XHS=11 and AD=1 in the figure, the column AD circuit 14a moves one row in the vertical direction and performs AD conversion on a pixel signal of an R pixel on the left side of the second highest stage of the sharing pixel 61 in the 122nd row.

At a sixth timing indicated by XHS=11 and AD=2 in the figure, the column AD circuit 14a performs AD conversion on a pixel signal of a Gr pixel on the right side of the second highest stage of the sharing pixel 61 in the 122nd row.

At a seventh timing indicated by XHS=12 and AD=1 in the figure, the column AD circuit 14a moves one row in the vertical direction and performs AD conversion on a pixel signal of a Gb pixel on the left side of the highest stage of the sharing pixel 61 in the 123rd row.

At a eighth timing indicated by XHS=12 and AD=1 in the figure, the column AD circuit 14a performs AD conversion on a pixel signal of a B pixel on the right side of the highest stage of the sharing pixel 61 in the 123rd row.

Thereafter, similar processing is repeated.

<Column Signal Processing Circuit in a Case where the Number of Parallel Stages is Two>

The above describes an example in which the number of parallel stage is one and the column signal processing circuit 14 accesses pixels in every other column in one row to perform AD conversion on the pixel signals. Alternatively, it is also allowable to have the number of parallel in row, and to access pixels in every other column in each of the rows, that is, simultaneously access pixels in two rows in execution of AD conversion of the pixel signals.

Figure 4:
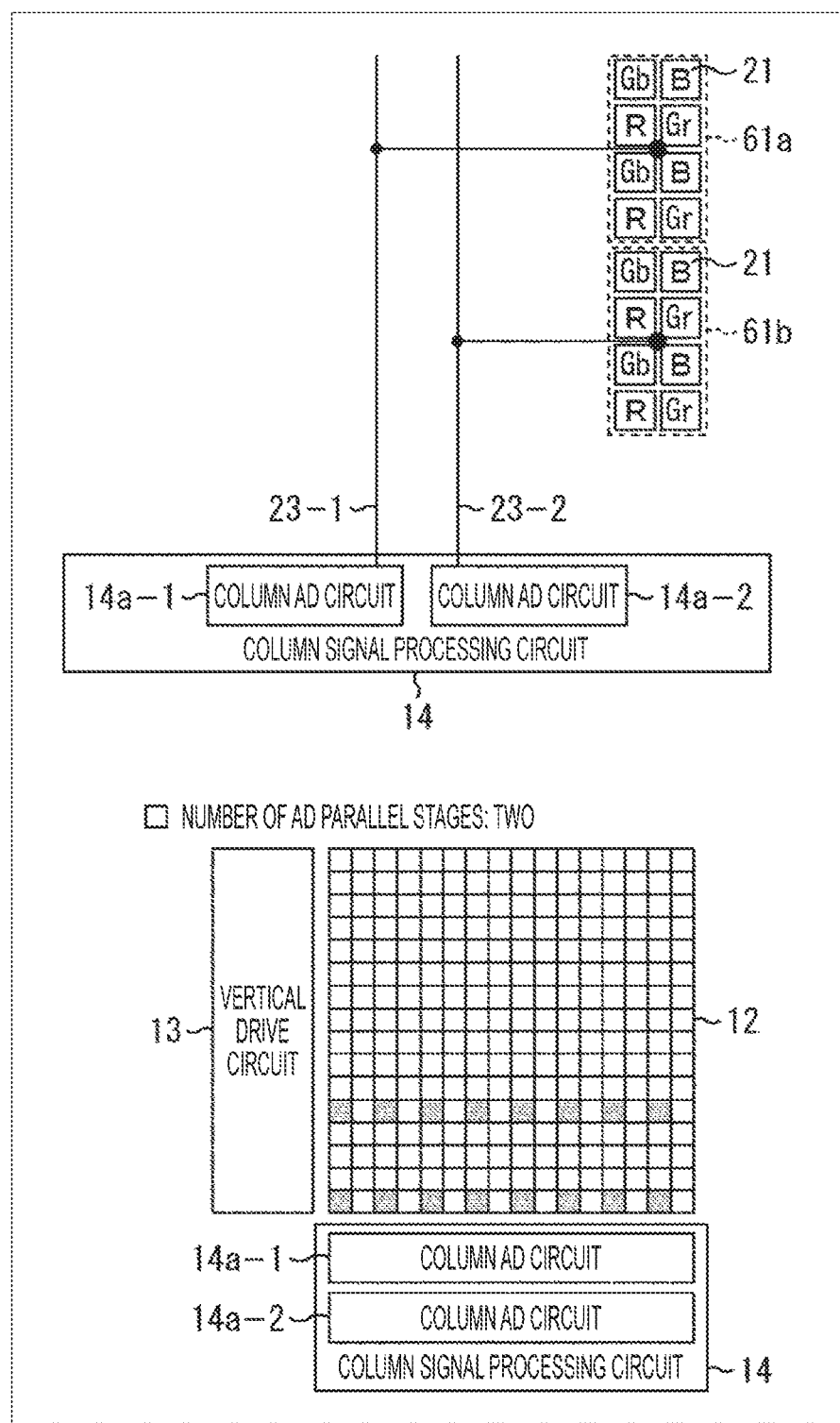
FIG. 4 is a diagram illustrating a relationship between a column signal processing circuit and sharing pixels in a case where the number of parallel stages is two.

FIG. 4 illustrates the column signal processing circuit 14 configured to access the pixels in every other column in each of rows, that is, simultaneously access pixels in two rows in execution of AD conversion of the pixel signals.

In this case, as illustrated in the upper part of FIG. 4, column AD circuits 14-1 and 14-2 access the individual pixels for two vertically adjacent sharing pixels 61a and 61b in execution of AD conversion.

Furthermore, as illustrated in the lower part of FIG. 4, the column AD circuits 14a-1 and 14a-2 are capable of accessing pixels of every other column for two pixel rows at three rows away by one pixel access in execution of AD conversion.

<Conventional AD Conversion Processing by Column Signal Processing Circuit in a Case where the Number of Parallel Stages is Two>

Next, conventional AD conversion processing by the column signal processing circuit 14 in a case where the number of parallel stages is two will be described with reference to FIG. 5.

Figure 5:
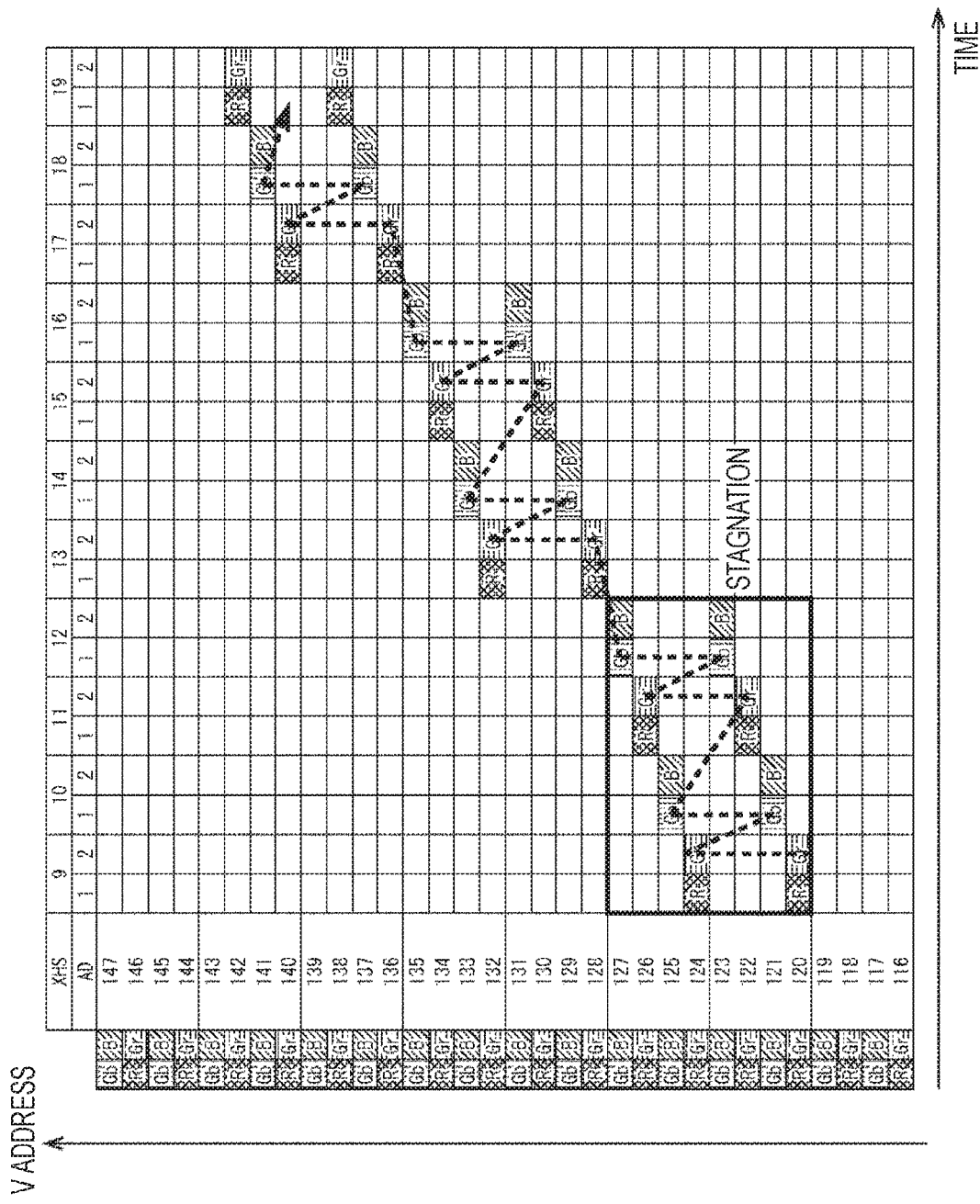
FIG. 5 is a diagram illustrating a conventional pixel access in AD conversion in the column signal processing circuit in FIG. 4.

Specifically, the column signal processing circuit 14 of FIG. 4 causes each of the column AD circuits 14a-1 and 14a-2 to perform AD conversion of pixel signals of two R pixels on the left side of the lowest stage of the sharing pixels 61a and 61b in the 124th and 120th rows, respectively, at a first timing indicated by XHS=9 and AD=1, as illustrated in FIG. 5.

At a second timing indicated by XHS=9 and AD=2, each of the column AD circuits 14a-1 and 14a-2 performs AD conversion on pixel signals of two Gr pixels on the right side of the lowest stage of the sharing pixels 61a and 61b in the 124th and 120th rows, respectively.

At a third timing indicated by XHS=10 and AD=1, each of the column AD circuits 14a-1 and 14a-2 respectively move one row in the vertical direction, and performs AD conversion on pixel signals of two Gb pixels on the left side of the second lowest stage of the sharing pixels 61a and 61b in the 125th and 121st rows.

At a fourth timing indicated by XHS=10 and AD=2, each of the column AD circuits 14a-1 and 14a-2 respectively performs AD conversion on pixel signals of two B pixels on the right side of the second lowest stage of the sharing pixels 61a and 61b in the 125th and 121st rows.

At the fifth timing indicated by XHS=11 and AD=1, each of the column AD circuits 14a-1 and 14a-2 respectively move one row in the vertical direction and performs AD conversion on pixel signals of two R pixels on the left side of the second highest stage of the sharing pixels 61a and 61b in the 126th and 122nd rows.

At a sixth timing indicated by XHS=11 and AD=2, each of the column AD circuits 14a-1 and 14a-2 respectively performs AD conversion on pixel signals of two Gr pixels on the right side of the second highest stage of the sharing pixels 61a and 61b in the 126th and 122nd rows.

At a seventh timing indicated by XHS=12 and AD=1, each of the column AD circuits 14a-1 and 14a-2 respectively move one row in the vertical direction and performs AD conversion on pixel signals of two Gb pixels on the left side of the highest stage of the sharing pixels 61a and 61b in the 127th and 123rd rows.

At an eighth timing indicated by XHS=12 and AD=2, each of the column AD circuits 14a-1 and 14a-2 respectively performs AD conversion on pixel signals of two B pixels on the right side of the highest stage of the sharing pixels 61a and 61b in the 127th and 123rd rows.

Then, at a ninth timing indicated by XHS=13 and AD=1, each of the column AD circuits 14a-1 and 14a-2 respectively move five rows in the vertical direction and performs AD conversion on pixel signals of two R pixels on the left side of the lowest stage of the sharing pixels 61a and 61b in the 132nd and 128th rows.

Thereafter, similar processing is repeated.

<Column Signal Processing Circuit in a Case where the Number of Parallel Stages is Four>

The above describes an example in which the number of parallel stage is two and the column signal processing circuit 14 accesses pixels in every other column in two rows simultaneously in execution of AD conversion on the pixel signals. Alternatively, it is also allowable to have the number of parallel stages of four, and to access pixels in every other column in each of the rows, that is, simultaneously access pixels in four rows in execution of AD conversion of the pixel signals.

Figure 6:
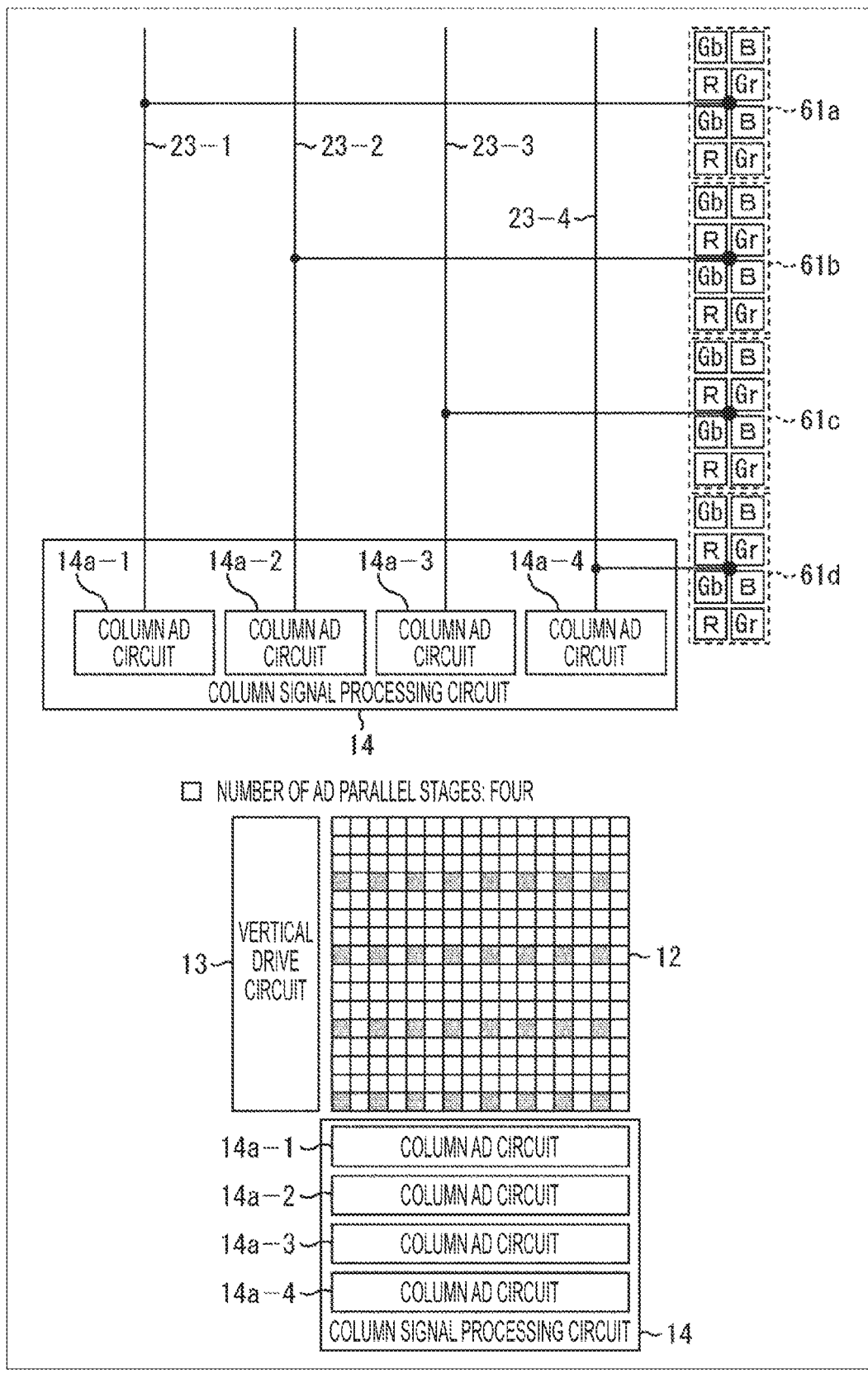
FIG. 6 is a diagram illustrating a relationship between a column signal processing circuit and sharing pixels in a case where the number of parallel stages is four.

FIG. 6 illustrates the column signal processing circuit 14 configured to have the number of parallel stages of four and access the pixels in every other column in each of rows, that is, simultaneously access pixels in four rows in execution of AD conversion of the pixel signals.

In this case, as illustrated in the upper part of FIG. 6, column AD circuits 14-1 and 14-4 access the individual pixels for four vertically adjacent sharing pixels 61a and 61d in execution of AD conversion.

Furthermore, as illustrated in the lower part of FIG. 6, each of the column AD circuits 14a-1 to 14a-4 is capable of accessing pixels of every other row for four pixel rows at three rows away by one pixel access in execution of AD conversion.

<Conventional AD Conversion Processing by Column Signal Processing Circuit in a Case where the Number of Parallel Stages is Four>

Next, conventional AD conversion processing by the column signal processing circuit in a case where the number of parallel stages is four will be described with reference to FIG. 7.

Figure 7:
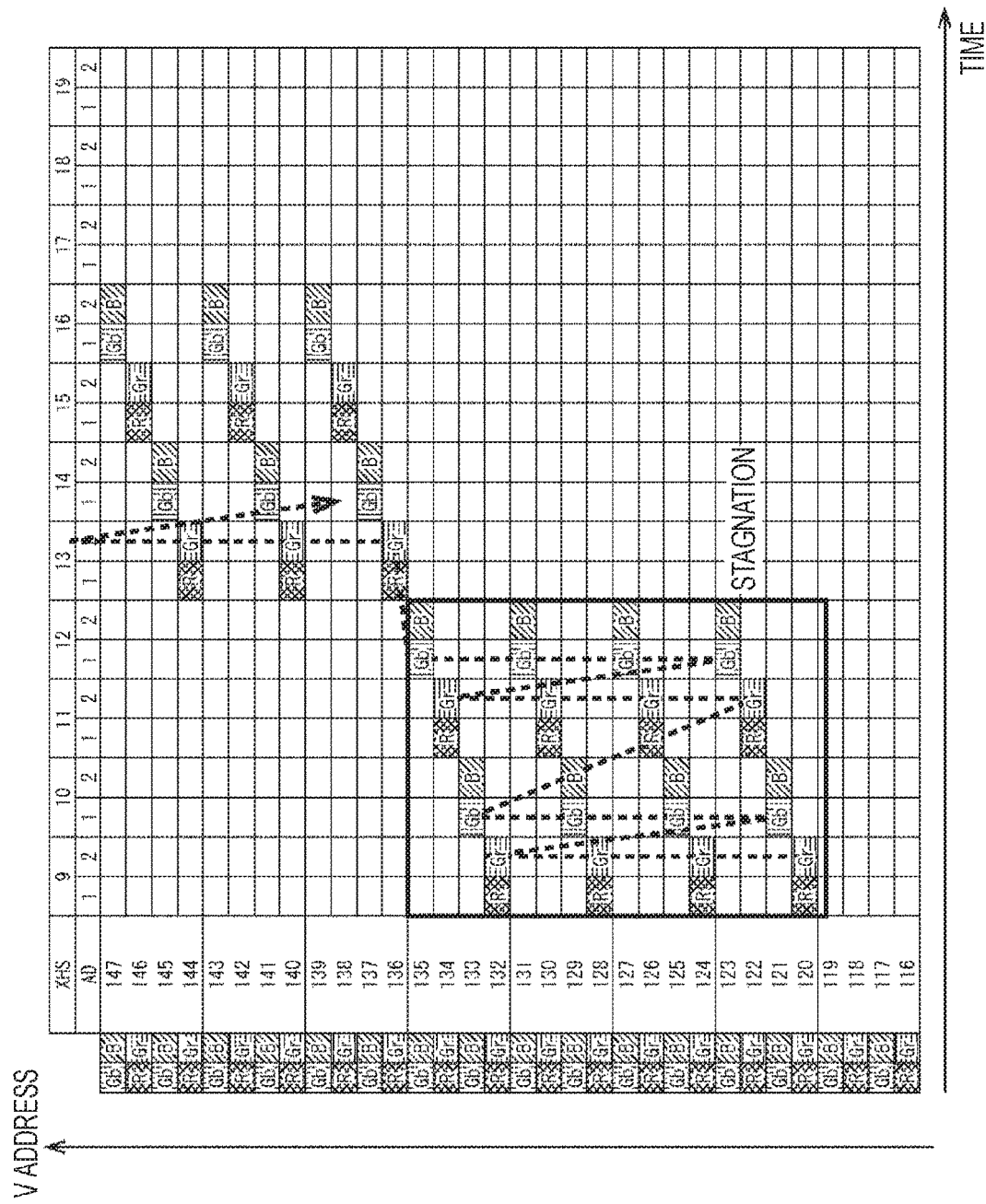
FIG. 7 is a diagram illustrating a conventional pixel access in AD conversion in the column signal processing circuit in FIG. 6.

Specifically, the column signal processing circuit 14 of FIG. 6 causes each of the column AD circuits 14a-1 to 14a-4 to perform AD conversion of pixel signals of four R pixels on the left side of the lowest stage of the sharing pixels 61a to 61d in the 132nd, 128th, 124th and 120th rows, respectively, at a first timing indicated by XHS=9 and AD=1, as illustrated in FIG. 7.

At a second timing indicated by XHS=9 and AD=2, each of the column AD circuits 14a-1 to 14a-4 respectively performs AD conversion on pixel signals of four Gr pixels on the right side of the lowest stage of the sharing pixels 61a to 61d in the 132nd, 128th, 124th and 120th rows.

At a third timing indicated by XHS=10 and AD=1, each of the column AD circuits 14a-1 to 14a-4 respectively moves one row in the vertical direction and performs AD conversion on pixel signals of four Gb pixels on the left side of the second lowest stage of the sharing pixels 61a to 61d in the 133rd, 129th, 125th and 121st rows.

At a fourth timing indicated by XHS=10 and AD=2, each of the column AD circuits 14a-1 to 14a-4 respectively performs AD conversion on pixel signals of four B pixels on the right side of the second lowest stage of the sharing pixels 61a to 61d in the 133rd, 129th, 125th and 121st rows.

At a fifth timing indicated by XHS=11 and AD=1, each of the column AD circuits 14a-1 to 14a-4 respectively moves one row in the vertical direction, and performs AD conversion on pixel signals of four R pixels on the left side of the second highest stage of the sharing pixels 61a to 61d in the 134th, 130th, 126th and 122nd rows.

At a sixth timing indicated by XHS=11 and AD=2, each of the column AD circuits 14a-1 to 14a-4 respectively performs AD conversion on pixel signals of four Gr pixels on the right side of the second highest stage of the sharing pixels 61a to 61d in the 134th, 130th, 126th and 122nd rows.

At a seventh timing indicated by XHS=12 and AD=1, each of the column AD circuits 14a-1 to 14a-4 respectively moves one row in the vertical direction and performs AD conversion on pixel signals of four Gb pixels on the left side of the highest stage of the sharing pixels 61a to 61d in the 135th, 131st, 127th and 123rd rows.

At an eighth timing indicated by XHS=12 and AD=2, each of the column AD circuits 14a-1 to 14a-4 respectively performs AD conversion on pixel signals of four B pixels on the right side of the highest stage of the sharing pixels 61a to 61d in the 135th, 131st, 127th and 123rd rows.

Then, at a ninth timing indicated by XHS=13 and AD=1, each of the column AD circuits 14a-1 and 14a-4 respectively moves five rows in the vertical direction and performs AD conversion on pixel signals of four R pixels on the left side of the lowest stage of the sharing pixels 61a to 61d in the 148th (not illustrated) 144th, 140th, and 136th rows.

Thereafter, similar processing is repeated.

<Column Signal Processing Circuit in a Case where the Number of Parallel Stages is Two and Pipeline Processing is Performed>

The above description is an example in which the column signal processing circuit 14 accesses pixels of four rows simultaneously every other column to perform AD conversion on the pixel signals. Alternatively, it is allowable to perform pipeline processing for a sharing pixel group in a plurality of lines with construction of a column AD circuit for each of the sharing pixels.

Figure 8:
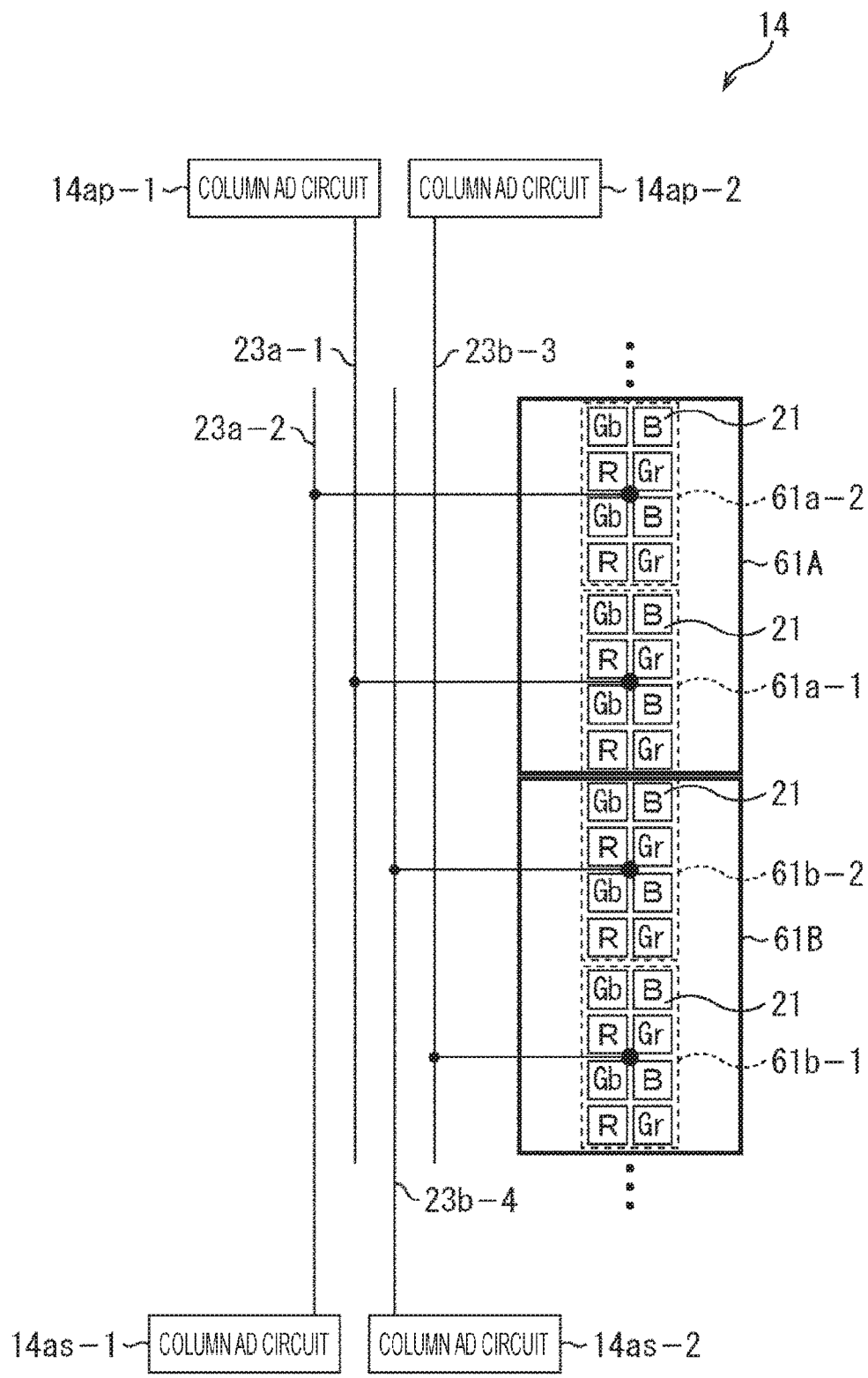
FIG. 8 is a diagram illustrating a relationship between a column signal processing circuit and sharing pixels in a case where the number of parallel stages is two and pipeline processing is included.

FIG. 8 illustrates the column signal processing circuit 14 in which, for a sharing pixel group including a plurality of sharing pixels, the number of parallel stages of the column AD circuit is set to two and pipeline processing is performed in two stages for each of the sharing pixels.

More specifically, the column signal processing circuit 14 of FIG. 8 includes: a sharing pixel group 61A formed with two sharing pixels 61a-1 and 61a-2 in the vertical direction;

and a sharing pixel group 61B formed with two sharing pixels 61b-1 and 61b-2 in the vertical direction, being provided alternately in the vertical direction. Furthermore, column AD circuits 14ap-1, 14as-1, and 14ap-1, 14as-2 are respectively provided for the sharing pixel groups 61A and 61B via the vertical signal lines 23a-1, 23a-2 and 23b-1, 23b-1.

<Conventional AD Conversion Processing by Column Signal Processing Circuit in a Case where the Number of Parallel Stages is Two and Pipeline Processing is Performed in Two Stages>

Next, conventional AD conversion processing by the column signal processing circuit in a case where the number of parallel stages is two and pipeline processing is performed in two stages will be described with reference to FIG. 9.

Figure 9:
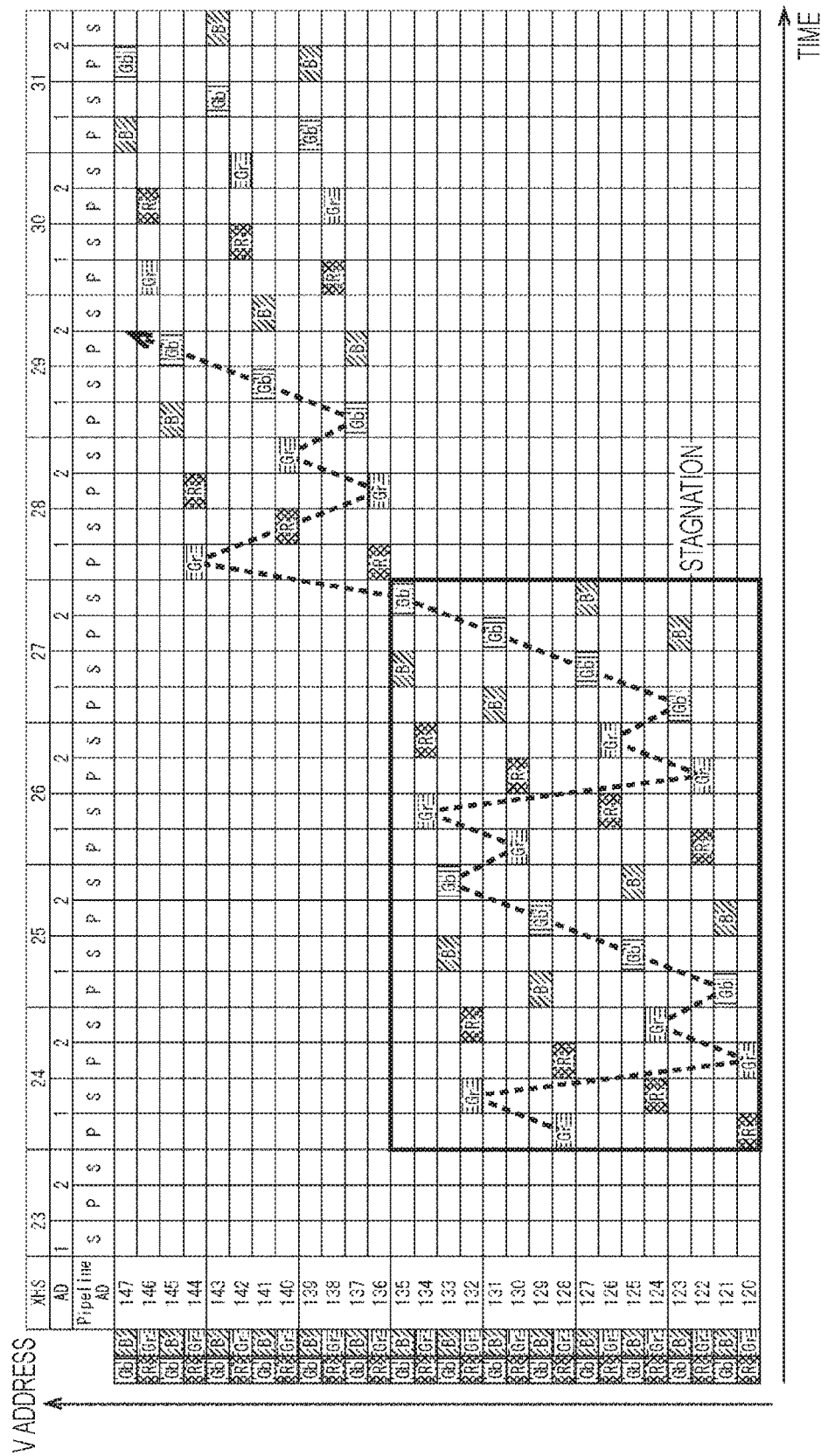
FIG. 9 is a diagram illustrating a conventional pixel access in AD conversion in the column signal processing circuit in FIG. 8.

With the configuration of the column signal processing circuit 14 in FIG. 8, at a first timing in XHS=24, AD=1, and pipeline AD=P, the column AD circuit 14ap-1 performs AD conversion on a Gr pixel on the right side of the lowest stage of the sharing pixel 61a-1 of the sharing pixel group 61A in the 128th row, while the column AD circuit 14ap-2 performs AD conversion on an R pixel on the left side of the lowest stage of the sharing pixel 61b-1 of the sharing pixel group 61B in the 120th row, that is, pixel signals of these two pixels undergo AD conversion, as illustrated in FIG. 9.

At a second timing in XHS=24, AD=1, and pipeline AD=S, the column AD circuit 14as-1 performs AD conversion on a Gr pixel on the right side of the lowest stage of the sharing pixel 61a-2 of the sharing pixel group 61A in the 132nd row, while the column AD circuit 14as-2 performs AD conversion on an R pixel on the left side of the lowest stage of the sharing pixel 61b-2 of the sharing pixel group 61B in the 124th row, that is, pixel signals of these two pixels undergo AD conversion.

At a third timing in XHS=24, AD=2, and pipeline AD=P, the column AD circuit 14ap-1 performs AD conversion on an R pixel on the left side of the lowest stage of the sharing pixel 61a-1 of the sharing pixel group 61A in the 128th row, while the column AD circuit 14ap-2 performs AD conversion on a Gr pixel on the right side of the lowest stage of the sharing pixel 61b-1 of the sharing pixel group 61B in the 120th row, that is, pixel signals of these two pixels undergo AD conversion.

At a fourth timing in XHS=24, AD=2, and pipeline AD=S, the column AD circuit 14as-1 performs AD conversion on an R pixel on the left side of the lowest stage of the sharing pixel 61a-2 of the sharing pixel group 61A in the 132nd row, while the column AD circuit 14as-2 performs AD conversion on a Gr pixel on the right side of the lowest stage of the sharing pixel 61b-2 of the sharing pixel group 61B in the 124th row, that is, pixel signals of these two pixels undergo AD conversion.

At a fifth timing in XHS=25, AD=1, and pipeline AD=P, the column AD circuit 14ap-1 performs AD conversion on a B pixel on the right side of the second lowest stage of the sharing pixel 61a-1 of the sharing pixel group 61A in the 129th row, while the column AD circuit 14ap-2 performs AD conversion on a Gb pixel on the left side of the second lowest stage of the sharing pixel 61b-1 of the sharing pixel group 61B in the 121st row, that is, pixel signals of these two pixels undergo AD conversion.

At a sixth timing in XHS=25, AD=1, and pipeline AD=S, the column AD circuit 14as-1 performs AD conversion on a B pixel on the right side of the second lowest stage of the sharing pixel 61a-2 of the sharing pixel group 61A in the 133rd row, while the column AD circuit 14as-2 performs AD conversion on a Gb pixel on the left side of the second lowest stage of the sharing pixel 61b-1 of the sharing pixel group 61B in the 125th row, that is, pixel signals of these two pixels undergo AD conversion.

At a seventh timing in XHS=25, AD=2, and pipeline AD=P, the column AD circuit 14ap-1 performs AD conversion on a Gb pixel on the left side of the second lowest stage of the sharing pixel 61a-1 of the sharing pixel group 61A in the 129th row, while the column AD circuit 14ap-2 performs AD conversion on a B pixel on the right side of the second lowest stage of the sharing pixel 61b-1 of the sharing pixel group 61B in the 121st row, that is, pixel signals of these two pixels undergo AD conversion.

At an eighth timing in XHS=25, AD=2, and pipeline AD=S, the column AD circuit 14as-1 performs AD conversion on a Gb pixel on the left side of the second lowest stage of the sharing pixel 61a-2 of the sharing pixel group 61A in the 133rd row, while the column AD circuit 14as-2 performs AD conversion on a B pixel on the right side of the second lowest stage of the sharing pixel 61b-2 of the sharing pixel group 61B in the 125th row, that is, pixel signals of these two pixels undergo AD conversion.

At a ninth timing in XHS=26, AD=1, and pipeline AD=P, the column AD circuit 14ap-1 performs AD conversion on a Gr pixel on the right side of the second highest stage of the sharing pixel 61a-1 of the sharing pixel group 61A in the 130th row, while the column AD circuit 14ap-2 performs AD conversion on an R pixel on the left side of the second highest stage of the sharing pixel 61b-1 of the sharing pixel group 61B in the 122nd row, that is, pixel signals of these two pixels undergo AD conversion.

At a tenth timing in XHS=26, AD=1, and pipeline AD=S, the column AD circuit 14as-1 performs AD conversion on a Gr pixel on the right side of the second highest stage of the sharing pixel 61a-2 of the sharing pixel group 61A in the 134th row, while the column AD circuit 14as-2 performs AD conversion on an R pixel on the left side of the second highest stage of the sharing pixel 61b-2 of the sharing pixel group 61B in the 126th row, that is, pixel signals of these two pixels undergo AD conversion.

At an eleventh timing in XHS=26, AD=2, and pipeline AD=P, the column AD circuit 14ap-1 performs AD conversion on an R pixel on the left side of the second highest stage of the sharing pixel 61a-1 of the sharing pixel group 61A in the 130th row, while the column AD circuit 14ap-2 performs AD conversion on a Gr pixel on the right side of the second highest stage of the sharing pixel 61b-1 of the sharing pixel group 61B in the 122nd row, that is, pixel signals of these two pixels undergo AD conversion.

At a twelfth timing in XHS=26, AD=2, and pipeline AD=S, the column AD circuit 14as-1 performs AD conversion on an R pixel on the left side of the second highest stage of the sharing pixel 61a-2 of the sharing pixel group 61A in the 134th row, while the column AD circuit 14as-2 performs AD conversion on a Gr pixel on the right side of the second highest stage of the sharing pixel 61b-2 of the sharing pixel group 61B in the 126th row, that is, pixel signals of these two pixels undergo AD conversion.

At a 13th timing in XHS=27, AD=1, and pipeline AD=P, the column AD circuit 14ap-1 performs AD conversion on a B pixel on the right side of the highest stage of the sharing pixel 61a-1 of the sharing pixel group 61A in the 131st row, while the column AD circuit 14ap-2 performs AD conversion on a Gb pixel on the left side of the highest stage of the sharing pixel 61b-1 of the sharing pixel group 61B in the 123rd row, that is, pixel signals of these two pixels undergo AD conversion.

At a 14th timing in XHS=27, AD=1, and pipeline AD=S, the column AD circuit 14*as*-1 performs AD conversion on a B pixel on the right side of the highest stage of the sharing pixel 61*a*-2 of the sharing pixel group 61A in the 135th row, while the column AD circuit 14*as*-2 performs AD conversion on a Gb pixel on the left side of the highest stage of the sharing pixel 61*b*-2 of the sharing pixel group 61B in the 127th row, that is, pixel signals of these two pixels undergo AD conversion.

At a 15th timing in XHS=27, AD=2, and pipeline AD=P, the column AD circuit 14*ap*-1 performs AD conversion on a Gb pixel on the left side of the highest stage of the sharing pixel 61*a*-1 of the sharing pixel group 61A in the 131st row, while the column AD circuit 14*ap*-2 performs AD conversion on a B pixel on the right side of the highest stage of the sharing pixel 61*b*-1 of the sharing pixel group 61B in the 123rd row, that is, pixel signals of these two pixels undergo AD conversion.

At a 16th timing in XHS=27, AD=2, and pipeline AD=S, the column AD circuit 14*as*-1 performs AD conversion on a Gb pixel on the left side of the highest stage of the sharing pixel 61*a*-2 of the sharing pixel group 61A in the 135th row, while the column AD circuit 14*as*-2 performs AD conversion on a B pixel on the right side of the highest stage of the sharing pixel 61*b*-2 of the sharing pixel group 61B in the 127th row, that is, pixel signals of these two pixels undergo AD conversion.

At a 17th timing in XHS=28, AD=1, and pipeline AD=P, the column AD circuit 14*ap*-1 moves eight rows upward and performs AD conversion on a Gr pixel on the right side of the lowest stage of the sharing pixel 61*a*-1 of the sharing pixel group 61A in the 144th row, while the column AD circuit 14*ap*-2 performs AD conversion on an R pixel on the left side of the lowest stage of the sharing pixel 61*b*-2 of the sharing pixel group 61B in the 136th row, that is, pixel signals of these two pixels undergo AD conversion.

Thereafter, the processing from the second timing to the 16th timing is repeated.

Note that in each of the sharing pixel 61*a*-1 and sharing pixel 61*b*-1, AD conversion of the pixel signal of the signal level and AD conversion of the pixel signal of the reset level are respectively performed in the column AD circuits 14*ap*-1 and 14*ap*-2, alternately in the pixels 21 included in each of the sharing pixel 61*a*-1 and sharing pixel 61*b*-1. In parallel to this, in each of the sharing pixel 61*a*-2 and sharing pixel 61*b*-2, AD conversion of the pixel signal of the signal level and AD conversion of the pixel signal of the reset level are respectively performed in the column AD circuits 14*as*-1 and 14*as*-2, alternately in the pixels 21 included in each of the sharing pixel 61*a*-2 and sharing pixel 61*b*-2.

In this manner, the column signal processing circuit 14 of FIG. 8 is capable of performing AD conversion in parallel in the column AD circuits 14*ap*-1, 14*ap*-2 and the column AD circuits 14*as*-1, 14*as*-2, enabling execution of AD conversion at higher speed.

More specifically, the first timing and the second timing, the third timing and the fourth timing, the fifth timing and the sixth timing, the seventh timing and the eighth timing, the ninth timing and the tenth timing, the eleventh timing and the twelfth timing, the 13th timing and the 14th timing, and the 15th timing and the 16th timing can individually be switched at high speed, making it possible to achieve substantially simultaneous processing.

As a result, the processing time from the first timing to the 16th timing in FIG. 9 is similar to the processing time from the first timing to the eighth timing in FIGS. 3, 5, and 7. For this reason, the conventional AD conversion processing by the column signal processing circuit in a case where the number of parallel stages of FIG. 8 is two in FIG. 9 and pipeline processing is performed in two stages has substantially the same processing efficiency as the conventional AD conversion processing by the column signal processing circuit in a case where the number of parallel stages of FIG. 6 is four in FIG. 7.

<Stagnation of AD Conversion Processing in Vertical Direction and AD Conversion Processing According to Present Disclosure>

In the series of AD conversion processing described above, the pixel signals of the Gr and Gb pixels defined as a reference of the luminance in the vertical direction displacement of the AD conversion processing in FIG. 3 are on the rise in time series in the vertical direction as indicated by a dotted line.

In contrast, in the AD conversion processing in a case where the number of parallel stages is two as illustrated in FIG. 5, displacement in the vertical direction of a readout range of the Gr and Gb pixels defined as a reference of luminance is in a stagnated state as indicated by a dotted line within the range from the 120th to the 127th rows during the period from the first timing to the eighth timing enclosed by the thick line. Even after this period, a stagnating range occurs for every range of the eight timings in the vertical direction.

Furthermore, in the AD conversion processing in a case where the number of parallel stages is four as illustrated in FIG. 7, displacement in the vertical direction of a readout range of the Gr and Gb pixels defined as a reference of luminance is in a stagnated state as indicated by a dotted line within the range from the 120th to the 135th rows during the period from the first timing to the eighth timing enclosed by the thick line. Even after this period, a stagnating range occurs for every range of the eight timings in the vertical direction.

Moreover, in the AD conversion processing in a case where the number of parallel stages is two as illustrated in FIG. 9 and the pipeline processing is performed, displacement in the vertical direction of a readout range of the Gr and Gb pixels defined as a reference of luminance is in a stagnated state as indicated by a dotted line within the range from the 120th to the 135th rows during the period from the first timing to the 16th timing enclosed by the thick line. Even after this period, a stagnating range occurs for every range of the 16 timings in the vertical direction.

In contrast, the column signal processing circuit 14 according to the present disclosure sets readout positions of the Gr and Gb pixels in order to suppress stagnation in the vertical displacement of the Gr and Gb pixels defined as the reference of the luminance, that is, in order to achieve substantially monotonically upward displacement in the vertical direction, and performs AD conversion with access to the pixels so as to allow the neighboring R and B pixels are read out in accordance with the readout positions of the Gr and Gb pixels that have been set.

Figure 10:
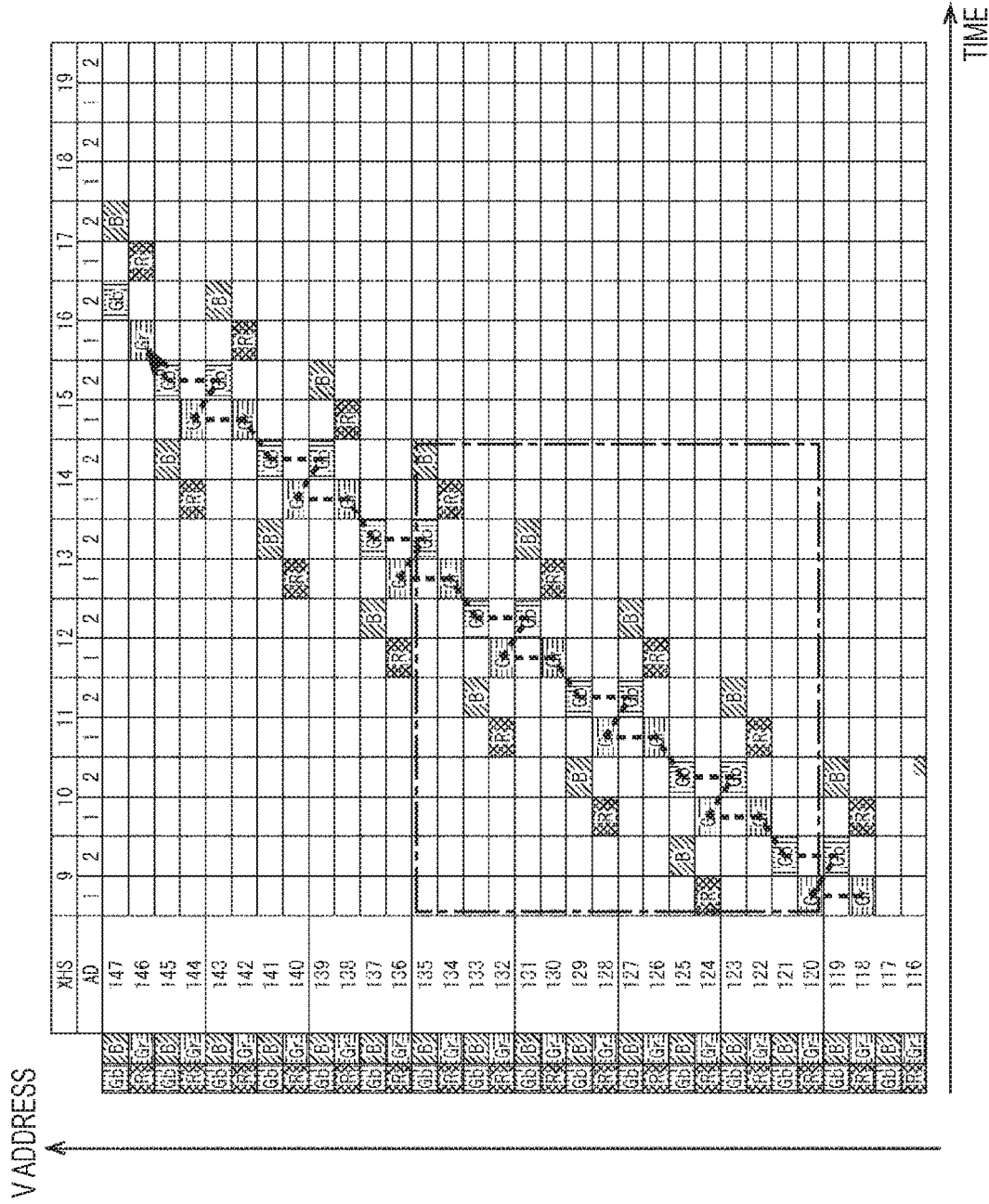
FIG. 10 is a diagram illustrating pixel access according to the present disclosure in AD conversion in the column signal processing circuit of FIG. 6.

More specifically, the column signal processing circuit 14 in a case where the number of parallel stages is four as illustrated in FIG. 6, for example, the Gr and Gb pixels are sequentially set so as to allow the displacement in the vertical direction of the Gr and Gb pixels defined as the reference of luminance to displace substantially monotonically upward as illustrated in FIG. 10, and sets to read out the R and B pixels in the sharing pixels at positions respectively close from the Gr and Gb pixels that have been set.

That is, at a first timing of XHS=9 and AD=1, each of the column AD circuits 14a-1 to 14a-4 respectively performs AD conversion on an R pixel on the left side of the lowest stage of the sharing pixel 61a in the 124th row, a Gr pixel on the right side of the lowest stage of the sharing pixel 61b in the 120th row, a Gr pixel on the right side of the second highest stage of the sharing pixel 61c in the 118th row, and an R pixel on the left side of the second highest stage of the sharing pixel 61d in the 114th row, that is, pixel signals of these four pixels undergo AD conversion.

At a second timing of XHS=9 and AD=2, each of the column AD circuits 14a-1 to 14a-4 respectively performs AD conversion on a B pixel on the right side of the second lowest stage of the sharing pixel 61a in the 125th row, a Gb pixel on the left side of the second lowest stage of the sharing pixel 61b in the 121st row, a Gb pixel on the left side of the highest stage of the sharing pixel 61c in the 119th row, and a B pixel on the right side of the highest stage of the sharing pixel 61d in the 115th row, that is, pixel signals of these four pixels undergo AD conversion.

At a third timing of XHS=10 and AD=1, each of the column AD circuits 14a-1 to 14a-4 respectively performs AD conversion of an R pixel on the left side of the lowest stage of the sharing pixel 61a in the 128th row, a Gr pixel on the right side of the lowest stage of the sharing pixel 61b in the 124th row, a Gr pixel on the right side of the second highest stage of the sharing pixel 61c in the 122nd row, and an R pixel on the left side of the second highest stage of the sharing pixel 61d in the 118th row, that is, pixel signals of these four pixels undergo AD conversion.

At a fourth timing of XHS=10 and AD=2, each of the column AD circuits 14a-1 to 14a-4 respectively performs AD conversion on a B pixel on the right side of the second lowest stage of the sharing pixel 61a in the 129th row, a Gb pixel on the left side of the second lowest stage of the sharing pixel 61b in the 125th row, a Gb pixel on the left side of the highest stage of the sharing pixel 61c in the 123rd row, and a B pixel on the right side of the highest stage of the sharing pixel 61d in the 119th row, that is, pixel signals of these four pixels undergo AD conversion.

At a fifth timing of XHS=11 and AD=1, each of the column AD circuits 14a-1 to 14a-4 respectively performs AD conversion on an R pixel on the left side of the lowest stage of the sharing pixel 61a in the 132nd row, a Gr pixel on the right side of the lowest stage of the sharing pixel 61b in the 128th row, a Gr pixel on the right side of the second highest stage of the sharing pixel 61c in the 126th row, and an R pixel on the left side of the second highest stage of the sharing pixel 61d in the 122nd row, that is, pixel signals of these four pixels undergo AD conversion.

At a sixth timing of XHS=11 and AD=2, each of the column AD circuits 14a-1 to 14a-4 respectively performs AD conversion on a B pixel on the right side of the second lowest stage of the sharing pixel 61a in the 133rd row, a Gb pixel on the left side of the second lowest stage of the sharing pixel 61b in the 129th row, a Gb pixel on the left side of the highest stage of the sharing pixel 61c in the 127th row, and a B pixel on the right side of the highest stage of the sharing pixel 61d in the 123rd row, that is, pixel signals of these four pixels undergo AD conversion.

At a seventh timing of XHS=12 and AD=1, each of the column AD circuits 14a-1 to 14a-4 respectively performs AD conversion on an R pixel on the left side of the lowest stage of the sharing pixel 61d in the 136th row, a Gr pixel on the right side of the lowest stage of the sharing pixel 61a in the 132nd row, a Gr pixel on the right side of the second highest stage of the sharing pixel 61b in the 130th row, and an R pixel on the left side of the second highest stage of the sharing pixel 61c in the 126th row, that is, pixel signals of these four pixels undergo AD conversion.

At an eighth timing of XHS=12 and AD=2, each of the column AD circuits 14a-1 to 14a-4 respectively performs AD conversion on a B pixel on the right side of the second lowest stage of the sharing pixel 61d in the 137th row, a Gb pixel on the left side of the second lowest stage of the sharing pixel 61a in the 133rd row, a Gb pixel on the left side of the highest stage of the sharing pixel 61b in the 131st row, and a B pixel on the right side of the highest stage of the sharing pixel 61c in the 127th row, that is, pixel signals of these four pixels undergo AD conversion.

Thereafter, the processing from the fifth timing to the eighth timing is repeated, for example.

As a result, the pixel signals of the sharing pixels 61a to 61d undergo AD conversion in the range surrounded by the one-dot chain line from the first timing to the 14th timing, for example. Here, for example, the timing from the first timing to the 14th timing is necessary until completion of the AD conversion of the pixel signals of the sharing pixels 61a to 61d in the range surrounded by the dotted line. Accordingly, processing time of 7/4 times the processing time needed from the first timing to the eighth timing in FIG. 7 would be needed. In the processing of FIG. 10, however, pixel signals corresponding to 7/4 times the pixel signals of the sharing pixels 61a to 61d are to undergo AD conversion by the processing from the first timing to the 14th timing, leading to substantially equal AD conversion efficiency.

Therefore, it is possible to achieve displacement of the Gb and Gr pixels defined as the reference of the luminance in the vertical direction that increases substantially monotonically without changing the AD conversion efficiency as indicated by the dotted line in FIG. 10, making it possible to suppress an occurrence of stagnation. Furthermore, AD conversion is performed on R and B pixels at positions close to the timing at which Gb and Gr pixels are read out at the timing in the vicinity thereof at this time, enabling reproduction of the R and B pixels using appropriate luminance values.

Note that while this example is the case where the number of parallel stages is four, it is also possible to achieve a similar effect even in other number of parallel stages, with the setting in which the displacement in the vertical direction of the pixels Gb and Gr defined as the reference of the luminance value increases substantially monotonically and with the setting thereafter in which the R and B pixels are read out at the position or the timing in the vicinity thereof.

<Column Signal Processing of Present Disclosure in a Case where the Number of Parallel Stages is Two and Pipeline Processing is Performed in Two Stages>

The above description has described an example of the column signal processing in the present disclosure in the column signal processing circuit in a case where the number of parallel stages is four. Alternatively, the description also applies to a case of the column signal processing in which the number of parallel stages is two and pipeline processing is performed in two stages.

Figure 11:
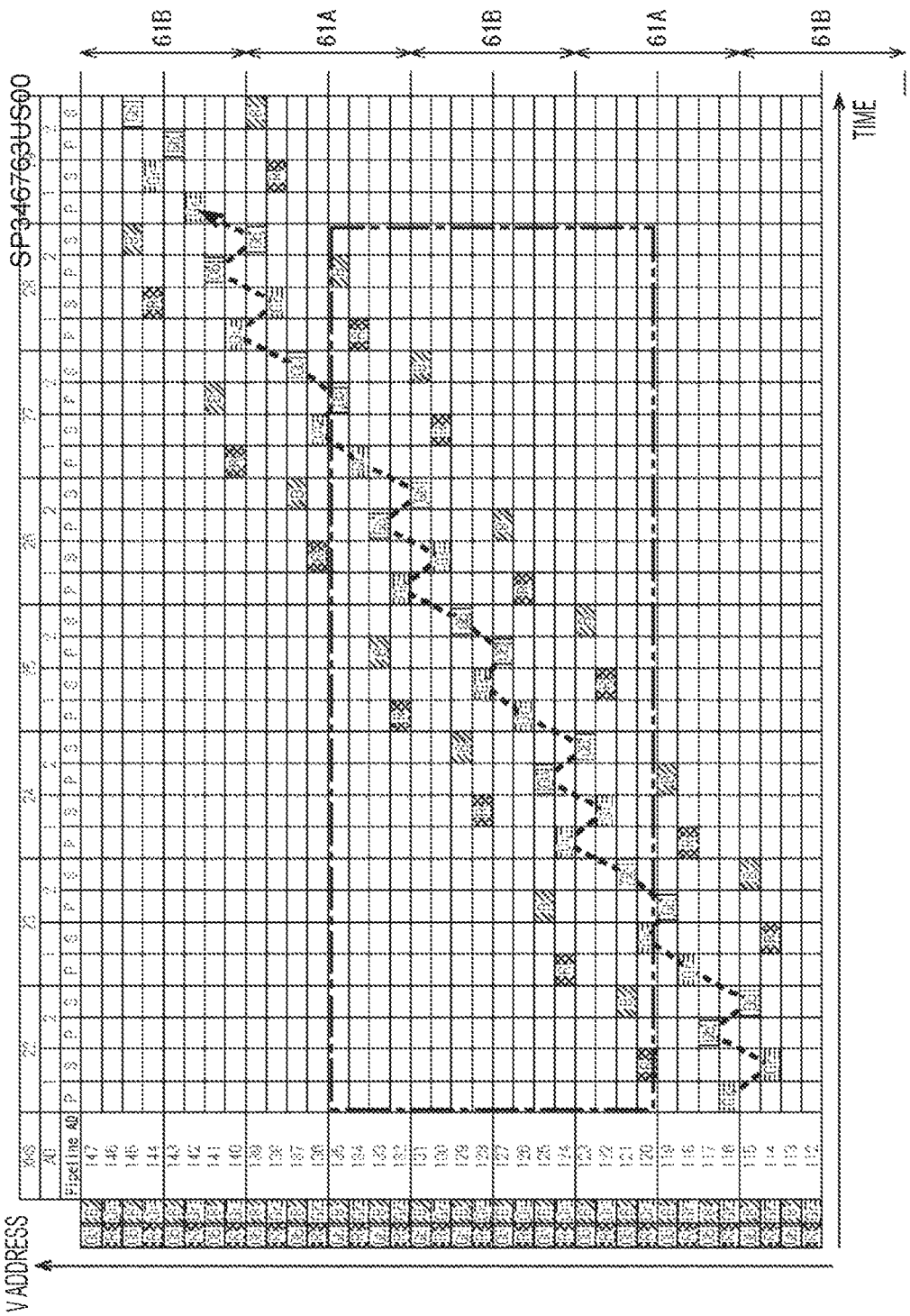
FIG. 11 is a diagram illustrating pixel access according to the present disclosure in AD conversion in the column signal processing circuit of FIG. 8.

FIG. 11 illustrates the column signal processing in the present disclosure in the column signal processing circuit in a case where the number of parallel stages is two and pipeline processing is performed in two stages.

That is, in this example, it is also allowable to first set pixel positions and timings of the Gr and Gb pixels for AD conversion to allow the vertical displacement of the Gr, Gb pixels defined as the reference of the luminance value to increase substantially monotonically, and thereafter, to read out R, and B pixels at the positions in the vicinity thereof, or timings in the vicinity thereof.

More specifically, as illustrated in FIG. 11, at a first timing in XHS=22, AD=1, and pipeline AD=P, the column AD circuit 14ap-1 performs AD conversion on a Gr pixel on the right side of the lowest stage of the sharing pixel 61a-1 of the sharing pixel group 61A in the 116th row, while the column AD circuit 14ap-2 performs AD conversion on an R pixel on the left side of the second highest stage of the sharing pixel 61b-1 of the sharing pixel group 61B in the 110th row (not illustrated), that is, pixel signals of these two pixels undergo AD conversion.

At a second timing in XHS=22, AD=1, and pipeline AD=S, the column AD circuit 14as-1 performs AD conversion on an R pixel on the left side of the lowest stage of the sharing pixel 61a-2 of the sharing pixel group 61A in the 120th row, while the column AD circuit 14as-2 performs AD conversion on a Gr pixel on the right side of the second highest stage of the sharing pixel 61b-2 of the sharing pixel group 61B in the 114th row, that is, pixel signals of these two pixels undergo AD conversion.

At a third timing in XHS=22, AD=2, and pipeline AD=P, the column AD circuit 14ap-1 performs AD conversion on a Gb pixel on the left side of the second lowest stage of the sharing pixel 61a-1 of the sharing pixel group 61A in the 117th row, while the column AD circuit 14ap-2 performs AD conversion on a B pixel on the right side of the highest stage of the sharing pixel 61b-1 of the sharing pixel group 61B in the 111st row (not illustrated), that is, pixel signals of these two pixels undergo AD conversion.

At a fourth timing in XHS=22, AD=2, and pipeline AD=S, the column AD circuit 14as-1 performs AD conversion on a B pixel on the right side of the second lowest stage of the sharing pixel 61a-2 of the sharing pixel group 61A in the 121st row, while the column AD circuit 14as-2 performs AD conversion on a Gb pixel on the left side of the second highest stage of the sharing pixel 61b-2 of the sharing pixel group 61B in the 115th row, that is, pixel signals of these two pixels undergo AD conversion.

At a fifth timing in XHS=23, AD=1, and pipeline AD=P, the column AD circuit 14ap-2 performs AD conversion on an R pixel on the left side of the lowest stage of the sharing pixel 61b-1 of the sharing pixel group 61B in the 124th row, while the column AD circuit 14ap-1 performs AD conversion on a Gr pixel on the right side of the second highest stage of the sharing pixel 61a-1 of the sharing pixel group 61A in the 118th row, that is, pixel signals of these two pixels undergo AD conversion.

At a sixth timing in XHS=23, AD=1, and pipeline AD=S, the column AD circuit 14as-1 performs AD conversion on a Gr pixel on the right side of the lowest stage of the sharing pixel 61a-2 of the sharing pixel group 61A in the 120th row, while the column AD circuit 14as-2 performs AD conversion on an R pixel on the left side of the second highest stage of the sharing pixel 61b-2 of the sharing pixel group 61B in the 114th row, that is, pixel signals of these two pixels undergo AD conversion.

At a seventh timing in XHS=23, AD=2, and pipeline AD=P, the column AD circuit 14ap-2 performs AD conversion on a B pixel on the right side of the second lowest stage of the sharing pixel 61b-1 of the sharing pixel group 61B in the 125th row, while the column AD circuit 14ap-1 performs AD conversion on a Gb pixel on the left side of the highest stage of the sharing pixel 61a-1 of the sharing pixel group 61A in the 119th row, that is, pixel signals of these two pixels undergo AD conversion.

At an eighth timing in XHS=23, AD=2, and pipeline AD=S, the column AD circuit 14as-1 performs AD conversion on a Gb pixel on the left side of the second lowest stage of the sharing pixel 61a-2 of the sharing pixel group 61A in the 121st row, while the column AD circuit 14as-2 performs AD conversion on a B pixel on the right side of the highest stage of the sharing pixel 61b-2 of the sharing pixel group 61B in the 115th row, that is, pixel signals of these two pixels undergo AD conversion.

At a ninth timing in XHS=24, AD=1, and pipeline AD=P, the column AD circuit 14ap-2 performs AD conversion on an Gr pixel on the right side of the lowest stage of the sharing pixel 61b-1 of the sharing pixel group 61B in the 124th row, while the column AD circuit 14ap-1 performs AD conversion on an R pixel on the left side of the second highest stage of the sharing pixel 61a-1 of the sharing pixel group 61A in the 118th row, that is, pixel signals of these two pixels undergo AD conversion.

At a tenth timing in XHS=24, AD=1, and pipeline AD=S, the column AD circuit 14as-2 performs AD conversion on an R pixel on the left side of the lowest stage of the sharing pixel 61b-2 of the sharing pixel group 61B in the 129th row, while the column AD circuit 14as-1 performs AD conversion on a Gr pixel on the right side of the second highest stage of the sharing pixel 61a-2 of the sharing pixel group 61A in the 122nd row, that is, pixel signals of these two pixels undergo AD conversion.

At an eleventh timing in XHS=24, AD=2, and pipeline AD=P, the column AD circuit 14ap-2 performs AD conversion on a Gb pixel on the left side of the second lowest stage of the sharing pixel 61b-1 of the sharing pixel group Secondary in the 125th row, while the column AD circuit 14ap-1 performs AD conversion on a B pixel on the right side of the highest stage of the sharing pixel 61a-1 of the sharing pixel group 61A in the 119th row, that is, pixel signals of these two pixels undergo AD conversion.

At a twelfth timing in XHS=24, AD=2, and pipeline AD=S, the column AD circuit 14as-2 performs AD conversion on a B pixel on the right side of the second lowest stage of the sharing pixel 61b-2 of the sharing pixel group 61B in the 129th row, while the column AD circuit 14as-1 performs AD conversion on a Gb pixel on the left side of the highest stage of the sharing pixel 61a-2 of the sharing pixel group 61A in the 123rd row, that is, pixel signals of these two pixels undergo AD conversion.

At a 13th timing in XHS=25, AD=1, and pipeline AD=P, the column AD circuit 14ap-1 performs AD conversion on an R pixel on the left side of the lowest stage of the sharing pixel 61a-1 of the sharing pixel group 61A in the 132nd row, while the column AD circuit 14ap-2 performs AD conversion on a Gr pixel on the right side of the second highest stage of the sharing pixel 61b-1 of the sharing pixel group 61B in the 123rd row, that is, pixel signals of these two pixels undergo AD conversion.

At a 14th timing in XHS=25, AD=1, and pipeline AD=S, the column AD circuit 14as-2 performs AD conversion on an Gr pixel on the right side of the lowest stage of the sharing pixel 61b-2 of the sharing pixel group 61B in the 128th row, while the column AD circuit 14as-1 performs AD conversion on an R pixel on the left side of the second highest stage of the sharing pixel 61b-2 of the sharing pixel group 61A in the 122nd row, that is, pixel signals of these two pixels undergo AD conversion.

At an 15th timing in XHS=25, AD=2, and pipeline AD=P, the column AD circuit 14ap-1 performs AD conversion on a B pixel on the right side of the second lowest stage of the sharing pixel 61a-1 of the sharing pixel group 61A in the 133rd row, while the column AD circuit 14*ap*-2 performs AD conversion on a Gb pixel on the left side of the highest stage of the sharing pixel 61*b*-1 of the sharing pixel group Secondary in the 127th row, that is, pixel signals of these two pixels undergo AD conversion.

At a 16th timing in XHS=25, AD=2, and pipeline AD=S, the column AD circuit 14*as*-1 performs AD conversion on a Gb pixel on the left side of the second lowest stage of the sharing pixel 61*a*-1 of the sharing pixel group 61A in the 129th row, while the column AD circuit 14*as*-2 performs AD conversion on a B pixel on the right side of the highest stage of the sharing pixel 61*b*-2 of the sharing pixel group 61B in the 126th row, that is, pixel signals of these two pixels undergo AD conversion.

After that, the processing from the sixth timing is repeated.

With this processing, the pixel signals of the sharing pixels 61*a* to 61*d* undergo AD conversion in a range surrounded by the one-dot chain line from the first timing to the 28th timing, for example. Here, for example, the timing from the first timing to the 28th timing is necessary until completion of AD conversion of the pixel signals of the sharing pixels 61*a* to 61*d* in the range surrounded by the dotted line. Accordingly, processing time longer than the processing time needed from the first timing to the eighth timing in FIG. 7 would be needed. In the processing of FIG. 11, however, the processing from the first timing to the 28th timing is executed to allow AD conversion on the pixel signals corresponding to 7/4 times the pixel signals of the sharing pixels 61*a* to 61*d*. Moreover, due to the high speed switching of pipeline processing of two stages, the timing from the first timing to the 28th timing in the processing of FIG. 11 is substantially similar to the timing in the processing from the first timing to the 14th timing in FIG. 7. From these, the column signal processing of FIG. 11 and the column signal processing of FIG. 7 have substantial equal AD conversion efficiency.

Therefore, it is possible to enable displacement of the Gb and Gr pixels defined as the reference of the luminance in the vertical direction to increase substantially monotonically without changing the AD conversion efficiency as indicated by the dotted line in FIG. 11, making it possible to suppress an occurrence of stagnation. Furthermore, AD conversion is performed on R and B pixels at positions close to the timing at which Gb and Gr pixels are read out at the timing in the vicinity thereof at this time, enabling reproduction of the R and B pixels using appropriate luminance values.

Note that while this example is the case where the number of parallel stages is two and the pipeline processing is performed in two stages, it is also possible to achieve a similar effect even in other number of parallel stages with pipeline processing, with the setting in which the displacement in the vertical direction of the pixels Gb and Gr defined as the reference of the luminance value increases substantially monotonically and with the setting thereafter in which the R and B pixels are read out at the position or the timing in the vicinity thereof.

<Effects by Present Disclosure>

The above processing suppresses the stagnation of the displacement of the pixel access in the vertical direction of the Gb and Gr pixels defined as the reference of the luminance value, leading to suppression image breakup in the image of the moving subject.

Note that while the above describes the case where the pixels defined as the reference pixels of the luminance value in the Bayer array are Gr and Gb pixels being green pixels, it is also possible, in a case where the pixels other than the green pixels are used as the reference pixels of the luminance values, to achieve the similar effect by suppressing the stagnation in the vertical direction at a read out position of the pixel defined as the reference of the luminance value. That is, in the case of using a white pixel (W pixel) as the reference of the luminance value, for example, it is possible to achieve the similar effect by suppressing the stagnation of the displacement in the vertical direction of the pixel access of the W pixel in the AD conversion processing. Accordingly, it is possible to achieve the similar effect by suppressing the stagnation of the displacement in the vertical direction of the pixel access of the pixel having a wavelength color defined as the reference of the luminance value in the AD conversion processing.

Furthermore, with the pixel access sequence of the pixel defined as the reference of the luminance value set so as to suppress stagnation of the displacement in the vertical direction in accordance with the number of parallel stages, the number of pipeline processing stages, the number of pixels sharing floating diffusion (FD), pixel array (Bayer array, stripe array, delta array, mosaic array, a white-red-green-blue (WRGB) pixel array, and the like), and the like, it is possible to suppress an occurrence of image breakup.

Moreover, the above description is an example of simultaneous scanning in the row direction, in which AD conversion is performed such that the pixel position is monotonically displaced so as not to stagnate in the vertical direction in the AD conversion of the pixel defined as the reference of luminance so as to suppress the occurrence of image breakup. Alternatively, in the case of simultaneous scanning in the column direction, for example, with the AD conversion of the pixel defined as the reference of the luminance performed so as not to allow the current pixel position to stagnate in the horizontal direction, it is possible to suppress the occurrence of image breakup.

Furthermore, while the above description is the example in which the R, Gr, Gb, and B pixels or the W pixels are arranged, it is also possible to use pixel array including pixels with different exposure times typified by high dynamic range (HDR), or the like. That is, even in such a case, with a configuration allowing pixel access to suppress stagnation of the displacement in the vertical direction of the pixel value defined as the reference of the luminance value having the different exposure times, it is possible to achieve the similar effect. At this time, with the AD conversion performed either simultaneously or at the timing in the vicinity thereof for the pixel signal of the pixel defined as the reference of the luminance value and the pixels other than the pixel defined as the reference of the luminance value, it would be possible to suppress the occurrence of image breakup in imaging of moving subjects.

<Exemplary Application to Electronic Device>

The above-described imaging element 11 can be applied, for example, to various electronic devices including imaging apparatuses such as a digital still camera and a digital video camera, a mobile phone having an imaging function, or other instrument having an imaging function.

Figure 12:
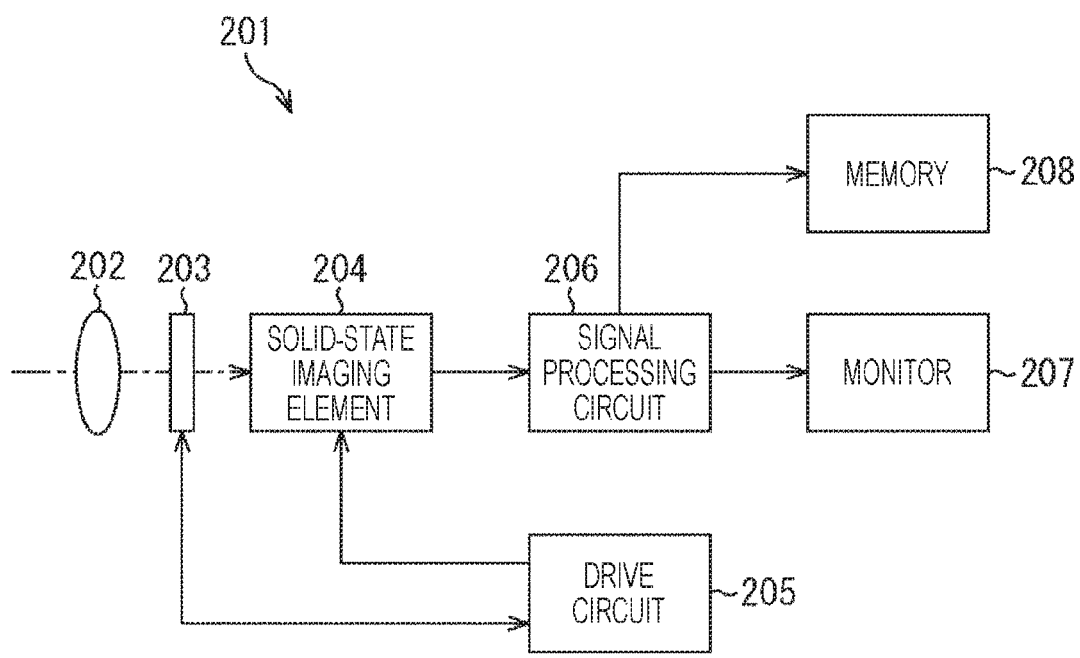
FIG. 12 is a block diagram illustrating a configuration example of an imaging apparatus as an electronic device according to the present technology.

FIG. 12 is a block diagram illustrating a configuration example of an imaging apparatus as an electronic device according to the present technology.

An imaging apparatus 201 illustrated in FIG. 12 includes an optical system 202, a shutter apparatus 203, a solid-state imaging element 204, a drive circuit 205, a signal processing circuit 206, a monitor 207, and a memory 208, and is capable of capturing a still image and a moving image.

The optical system 202 includes one or more lenses, guides the light (incident light) from a subject to the solid-state imaging element 204, and forms an image on a light receiving surface of the solid-state imaging element 204.

The shutter apparatus 203 is arranged between the optical system 202 and the solid-state imaging element 204, and controls the light-emitting period and light-shielding period toward the solid-state imaging element 204 in accordance with the control by the drive circuit 1005.

The solid-state imaging element 204 is formed with a package including the above-described solid-state imaging element. The solid-state imaging element 204 accumulates a signal charge for a fixed period of time in accordance with the light that forms an image on the light receiving surface via the optical system 202 and the shutter apparatus 203. Signal charge accumulated in the solid-state imaging element 204 is transferred in accordance with the drive signal (timing signal) supplied from the drive circuit 205.

The drive circuit 205 drives the solid-state imaging element 204 and the shutter apparatus 203 by outputting a drive signal to control transfer operation of the solid-state imaging element 204 and shutter operation of the shutter apparatus 203.

The signal processing circuit 206 performs various types of signal processing on a signal charge output from the solid-state imaging element 204. The image (image data) obtained by signal processing by the signal processing circuit 206 is supplied to the monitor 207 and displayed, or supplied to the memory 208 and stored (recorded).

Even in the imaging apparatus 201 configured as described above, it is possible to reduce image breakup with application of the imaging element 11 instead of the above-described solid-state imaging element 204.

<Application Example of Solid-State Imaging Element>

Figure 13:
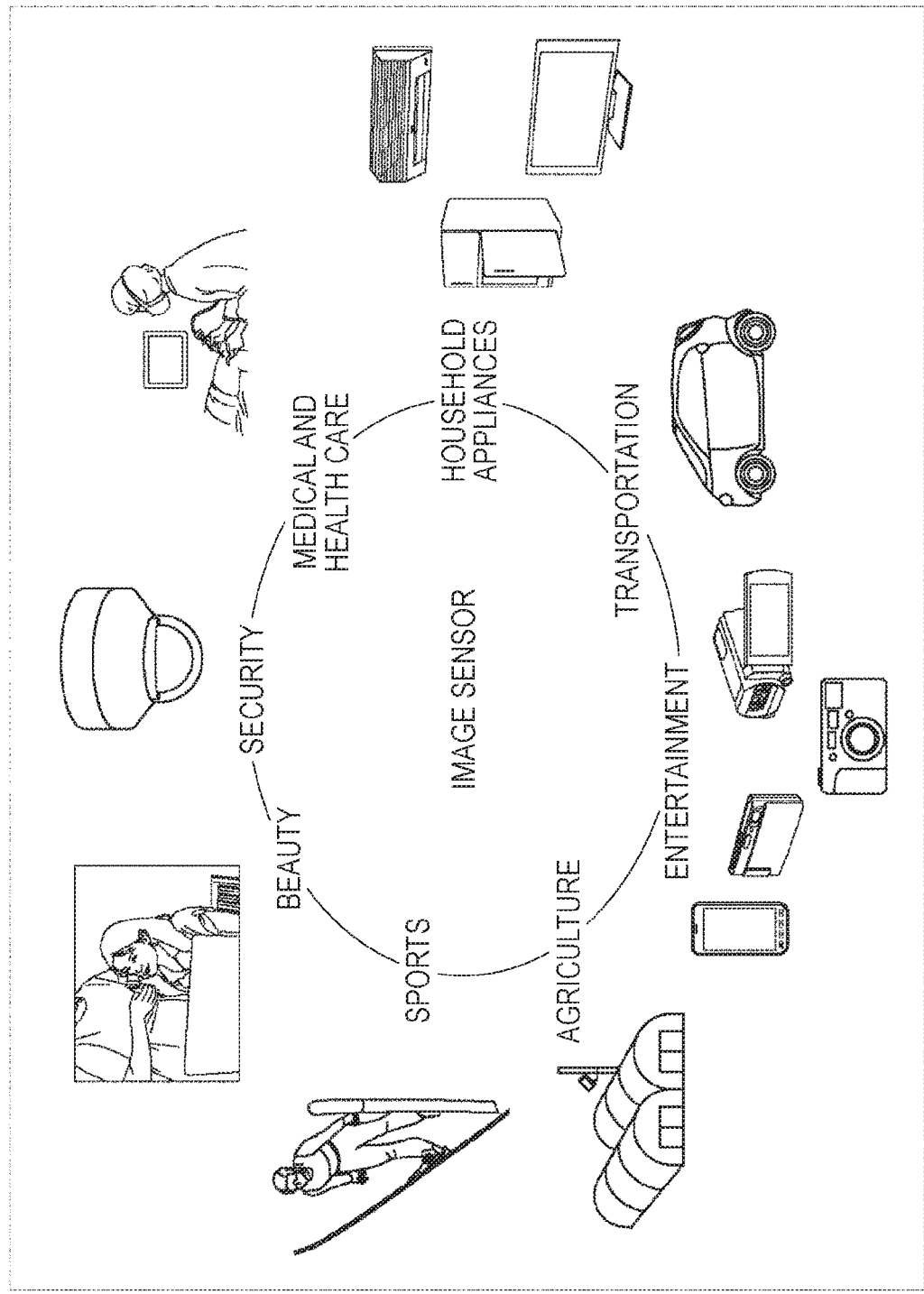
FIG. 13 is a diagram illustrating a use example of the solid-state imaging apparatus of FIG. 1.

FIG. 13 is a diagram illustrating an application example in which the above-described solid-state imaging element 11 is used.

The above-described solid-state imaging element is applicable to various situations in which sensing is performed for light such as visual light, infrared light, ultraviolet light, and X-ray. Examples of such situations are described as follows, for example.

- A device for capturing an image for entertainment, such as a digital camera and a mobile phone with a camera function.
- A device for transportation, such as an on-vehicle sensor that photographs a front, back, surroundings, interior, or the like, of a vehicle in order to ensure safe driving such as automatic stop, and to recognize driver's conditions, a monitor camera to monitor driving vehicles and roads, and a range-finding sensor to perform measurement of a distance between vehicles, or the like.
- A device for household appliances including a TV, a refrigerator, an air conditioner, and the like to photograph user's gesture and perform operation of the apparatus according to the gesture.
- A device for medical and health care fields, such as an endoscope, and a device for angiography using reception of infrared light.
- A device for security, such as a monitor camera for crime prevention, and a camera for personal authentication.
- A device for beauty, such as a skin measuring instrument to photograph the skin, and a microscope to photograph the scalp.
- A device for sports, such as an action camera and a wearable camera for sports applications or the like.
- A device for agriculture, such as a camera to monitor conditions of fields and crops.

Note that the present disclosure can also take the following configuration.

<1> A solid-state imaging element including:
an imaging element that has a predetermined color arrangement on a pixel basis and captures an image; and
an analog-to-digital converter that simultaneously scans pixel signals of the image in a predetermined direction to perform analog-to-digital conversion of the signals,
in which the analog-to-digital converter performs analog-to-digital conversion on pixel signals of pixels having a color arrangement defined as a reference of a luminance value among the pixels of the image in an order not causing stagnation in the predetermined direction.

<2> The solid-state imaging element according to <1>,
in which the analog-to-digital converter performs analog-to-digital conversion on pixel signals of pixels having a color arrangement defined as a reference of a luminance value among the pixel signals of the image in an order not causing stagnation in the predetermined direction, in accordance with pixel array, the number of rows and the number of columns for simultaneous scanning, and the number of pixels that share floating diffusion (FD).

<3> The solid-state imaging element according to <2>,
in which the pixel array includes a Bayer array, a stripe array, a delta array, a mosaic array, and a white-red-green-blue (WRGB) pixel array.

<4> The solid-state imaging element according to <2>,
in which the pixel array includes pixels having different exposure times as pixels with different color arrangement.

<5> The solid-state imaging element according to any of <1> to <4>,
in which the pixels having the color arrangement defined as the reference of the luminance value includes green pixels and white pixels.

<6> The solid-state imaging element according to any of <1> to <5>,
in which the analog-to-digital converter performs simultaneous scan and analog-to-digital conversion on the pixel signals of the pixels having the color arrangement other than the color arrangement defined as the reference of the luminance value, the pixels being in the vicinity of the pixel having the color arrangement defined as the reference of the luminance value, or performs analog-to-digital conversion at a timing in the vicinity thereof.

<7> An operation method for a solid-state imaging element including:
an imaging element that has a predetermined color arrangement on a pixel basis and captures an image; and
an analog-to-digital converter that simultaneously scans pixel signals of the image in a predetermined direction to perform analog-to-digital conversion of the signals,
in which the analog-to-digital converter performs analog-to-digital conversion on pixel signals of pixels having a color arrangement defined as a reference of a luminance value among the pixels of the image in an order not causing stagnation in the predetermined direction.

<8> An imaging apparatus including:
an imaging element that has a predetermined color arrangement on a pixel basis and captures an image; and
an analog-to-digital converter that simultaneously scans pixel signals of the image in a predetermined direction to perform analog-to-digital conversion of the signals,
in which the analog-to-digital converter performs analog-to-digital conversion on pixel signals of pixels having a color arrangement defined as a reference of a luminance value among the pixels of the image in an order not causing stagnation in the predetermined direction.

<9> An electronic device including:
an imaging element that has a predetermined color arrangement on a pixel basis and captures an image; and
an analog-to-digital converter that simultaneously scans pixel signals of the image in a predetermined direction to perform analog-to-digital conversion of the signals,
in which the analog-to-digital converter performs analog-to-digital conversion on pixel signals of pixels having a color arrangement defined as a reference of a luminance value among the pixels of the image in an order not causing stagnation in the predetermined direction.

REFERENCE SIGNS LIST

11 Imaging element
12 Pixel region
13 Vertical drive circuit
14 Column signal processing circuit
14a, 14a-1 to 14a-4, 14ap-1, 14ap-2, 14as-1, 14as-2 Column AD circuit
15 Horizontal drive circuit
16 Output circuit
17 Ramp signal generation circuit
18 Control circuit
21 Pixel
22 Horizontal signal line
23, 23-1 to 23-4, 23as-1, 23as-2 Vertical signal line
24 Data output signal line

The invention claimed is:

1. A solid-state imaging element, comprising:
an imaging element configured to capture an image, wherein
the imaging element includes a plurality of pixels in a pixel array, and
the plurality of pixels has a first color arrangement; and
an analog-to-digital converter configured to:
simultaneously scan, in a specific direction, pixel signals of a first set of pixels of the plurality of pixels, wherein the pixel signals of the first set of pixels is associated with the image; and
execute analog-to-digital conversion on the pixel signals of the first set of pixels to suppress stagnation of a displacement of pixel access, wherein
the suppression of the stagnation is in the specific direction,
the execution of the analog-to-digital conversion on the pixel signals of the first set of pixels is based on a number of pixels of the plurality of pixels that shares floating diffusion (FD), and
the first set of pixels has a second color arrangement that corresponds to a reference of a luminance value.

2. The solid-state imaging element according to claim 1, wherein the analog-to-digital converter is further configured to execute the analog-to-digital conversion on the pixel signals of the first set of pixels based on the pixel array, and one of a count of rows of the pixel array or a count of columns of the pixel array for the simultaneous scan.

3. The solid-state imaging element according to claim 2, wherein the pixel array includes at least one of a Bayer array, a stripe array, a delta array, a mosaic array, or a white-red-green-blue (WRGB) pixel array.

4. The solid-state imaging element according to claim 2, wherein
a second set of pixels of the plurality of pixels has different exposure times, and
the second set of pixels has a third color arrangement.

5. The solid-state imaging element according to claim 1, wherein the first set of pixels includes green pixels and white pixels.

6. The solid-state imaging element according to claim 1, wherein the analog-to-digital converter is further configured to execute one of:
simultaneous scan and analog-to-digital conversion on pixel signals of a second set of pixels of the plurality of pixels, wherein
the second set of pixels has a third color arrangement different from the second color arrangement, and
the second set of pixels is in vicinity of the first set of pixels, or
the analog-to-digital conversion on the pixel signals of the second set of pixels at a specific timing associated with the second set of pixels.

7. An operation method, comprising:
in a solid-state imaging element:
capturing an image by an imaging element of the solid-state imaging element, wherein
the imaging element includes a plurality of pixels in a pixel array, and
the plurality of pixels has a first color arrangement;
simultaneously scanning, in a specific direction, by an analog-to-digital converter of the solid-state imaging element, pixel signals of a set of pixels of the plurality of pixels, wherein the pixel signals of the set of pixels is associated with the image; and
executing, by the analog-to-digital converter, analog-to-digital conversion on the pixel signals of the set of pixels to suppress stagnation of a displacement of pixel access, wherein
the suppression of the stagnation is in the specific direction,
the execution of the analog-to-digital conversion on the pixel signals of the set of pixels is based on a number of pixels of the plurality of pixels that shares floating diffusion (FD), and
the set of pixels has a second color arrangement that corresponds to a reference of a luminance value.

8. An imaging apparatus, comprising:
an imaging element configured to capture an image, wherein
the imaging element includes a plurality of pixels in a pixel array, and
the plurality of pixels has a first color arrangement; and
an analog-to-digital converter configured to:
simultaneously scan, in a specific direction, pixel signals of a set of pixels of the plurality of pixels, wherein the pixel signals of the set of pixels is associated with the image; and
execute analog-to-digital conversion on the pixel signals of the set of pixels to suppress stagnation of a displacement of pixel access, wherein
the suppression of the stagnation is in the specific direction,
the execution of the analog-to-digital conversion on the pixel signals of the set of pixels is based on a number of pixels of the plurality of pixels that shares floating diffusion (FD), and
the set of pixels has a second color arrangement that corresponds to a reference of a luminance value.

9. An electronic device, comprising:
an imaging element configured to capture an image, wherein
the imaging element includes a plurality of pixels in a pixel array, and the plurality of pixels has a first color arrangement; and
an analog-to-digital converter configured to:
- simultaneously scans scan, in a specific direction, pixel signals of a set of pixels of the plurality of pixels, wherein the pixel signals of the set of pixels is associated with the image; and
- execute analog-to-digital conversion on the pixel signals of the set of pixels to suppress stagnation of a displacement of pixel access, wherein
  the suppression of the stagnation is in the specific direction,
  the execution of the analog-to-digital conversion on the pixel signals of the set of pixels is based on a number of pixels of the plurality of pixels that shares floating diffusion (FD), and
  the set of pixels has a second color arrangement that corresponds to a reference of a luminance value.

\* \* \* \* \*